(12) United States Patent
Liepold

(10) Patent No.: US 7,923,633 B2
(45) Date of Patent: Apr. 12, 2011

(54) HOLDER AND A PLACEMENT TOOL THEREFOR

(76) Inventor: Gerhard Liepold, Watchung, NJ (US)

(*) Notice: Subject to any disclaimer, the term of this patent is extended or adjusted under 35 U.S.C. 154(b) by 571 days.

(21) Appl. No.: 11/661,345

(22) PCT Filed: Aug. 26, 2005

(86) PCT No.: PCT/US2005/030525
§ 371 (c)(1),
(2), (4) Date: Jul. 18, 2008

(87) PCT Pub. No.: WO2006/026491
PCT Pub. Date: Mar. 9, 2006

(65) Prior Publication Data
US 2008/0277159 A1    Nov. 13, 2008

Related U.S. Application Data

(60) Provisional application No. 60/605,303, filed on Aug. 27, 2004, provisional application No. 60/636,386, filed on Dec. 15, 2004.

(51) Int. Cl.
*H02G 3/08* (2006.01)
(52) U.S. Cl. .......... 174/50; 174/480; 174/481; 439/535; 248/906
(58) Field of Classification Search ............. 174/50, 174/480, 481; 439/535; 220/4.02; 248/906
See application file for complete search history.

(56) References Cited

U.S. PATENT DOCUMENTS

| | | | |
|---|---|---|---|
| 2,282,441 A | 5/1942 | Whitlock | |
| 4,515,484 A | 5/1985 | Gilley | |
| 5,285,054 A | 2/1994 | Barsky | |
| 5,340,326 A * | 8/1994 | LeMaster | 439/207 |
| 5,539,986 A | 7/1996 | De Souza | |
| 7,601,922 B2 * | 10/2009 | Larsen et al. | 174/481 |
| 7,679,007 B1 * | 3/2010 | Walker et al. | 174/481 |
| 7,692,104 B2 * | 4/2010 | Charon et al. | 174/481 |
| 7,696,435 B1 * | 4/2010 | Thomas et al. | 174/68.3 |

FOREIGN PATENT DOCUMENTS

| EP | 1267151 A1 | 12/2002 |
|---|---|---|
| JP | 61-219841 | 9/1986 |

OTHER PUBLICATIONS

English abstract of JP 61-219841.

* cited by examiner

*Primary Examiner* — Dhiru R Patel
(74) *Attorney, Agent, or Firm* — Hoffmann & Baron, LLP

(57) ABSTRACT

A holder device (1,100) for an article such as a thermocouple (9) is disclosed. The holder (1, 100) facilitates the placement and retention of the thermocouple (9) in an apparatus such as a lyophilizer by clamping the thermocouple (9) stably in position between adjacent shelves (80, 90) of the apparatus. The holder (1,100) comprises two bearing surfaces (14a, 126b) and a housing (10) extending therebetween. The housing (10) includes a spring (11) for biasing the bearing surfaces (14a, 126b) apart to retain the holder (1,100) between the shelves (80, 90). Also provided is a means for retaining a conduit, such as a thermocouple (9) or other device. The thermocouple retaining means comprises a conductive block (230) for securely holding within it a sensor end of a thermocouple (9) and a means is provided for retaining the block (230) with the thermocouple (9) in good conductive contact with a surface (80, 90) of the apparatus. The invention further provides a placement tool (2) for positioning and removing the holder (1, 100).

26 Claims, 16 Drawing Sheets

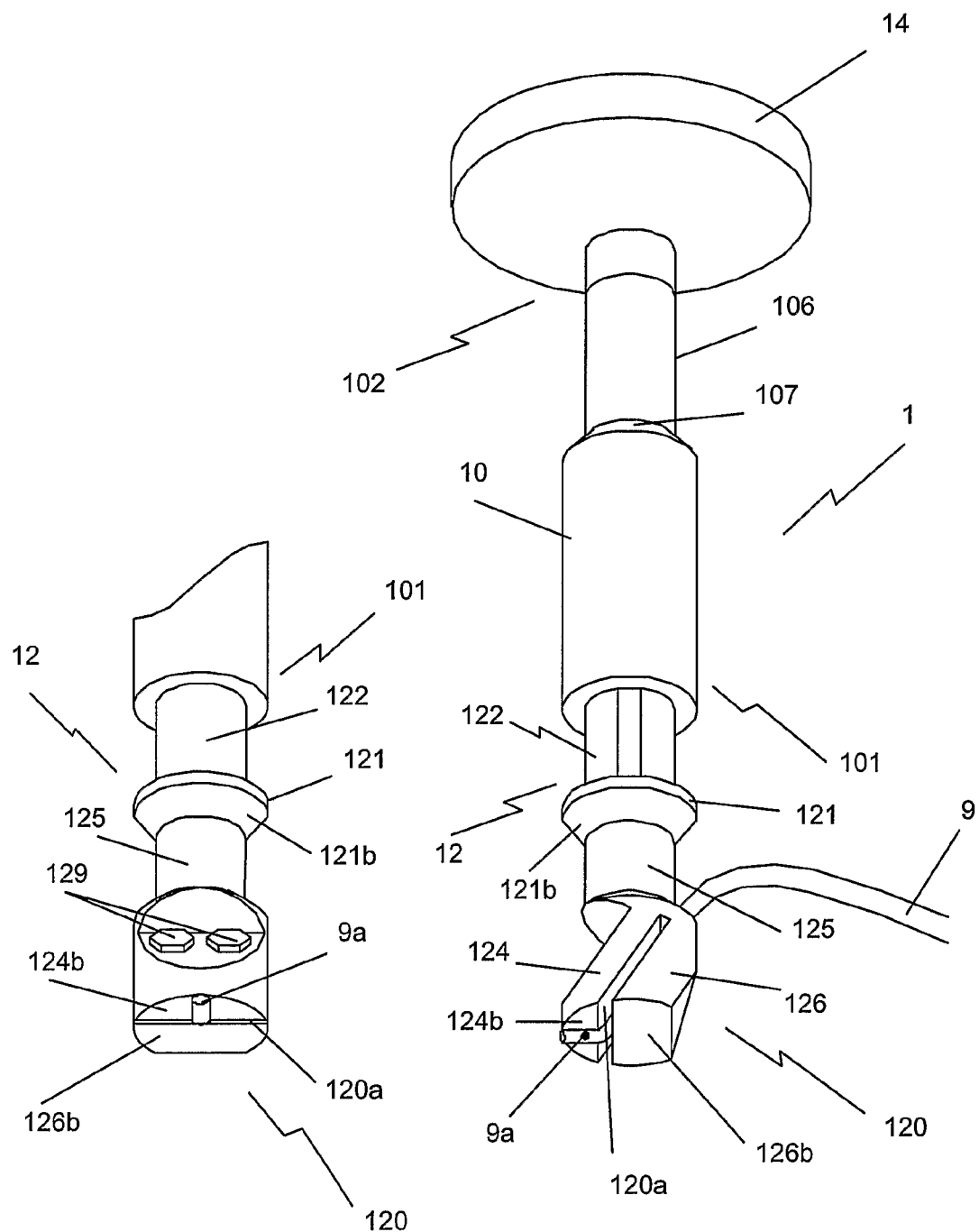

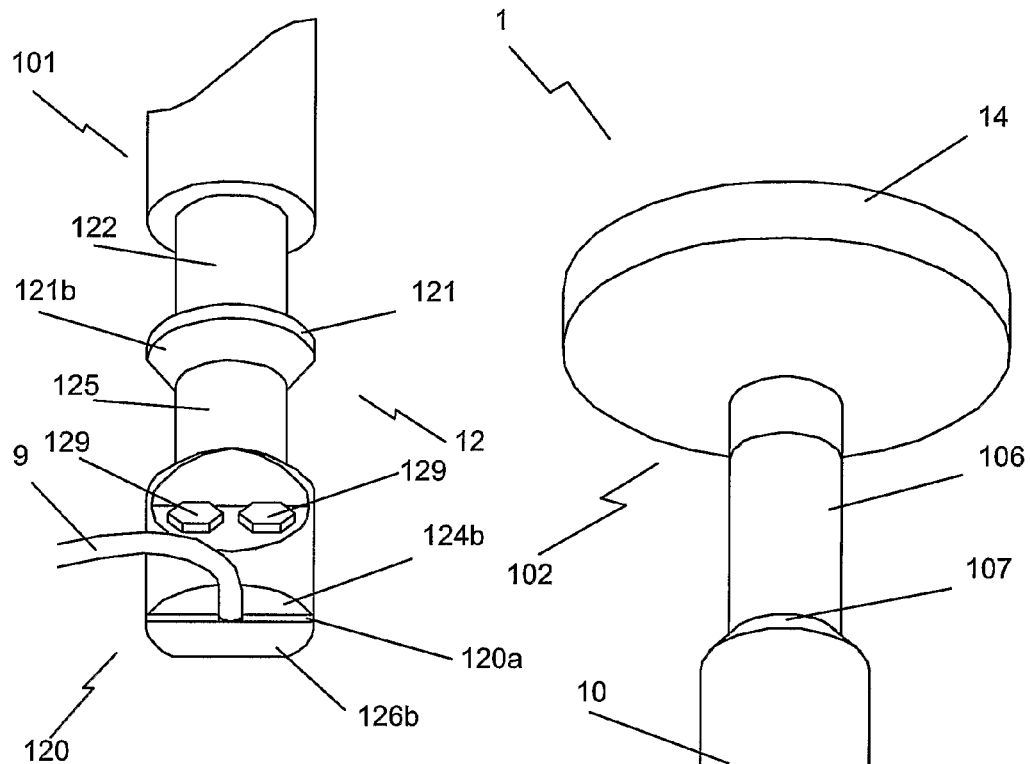
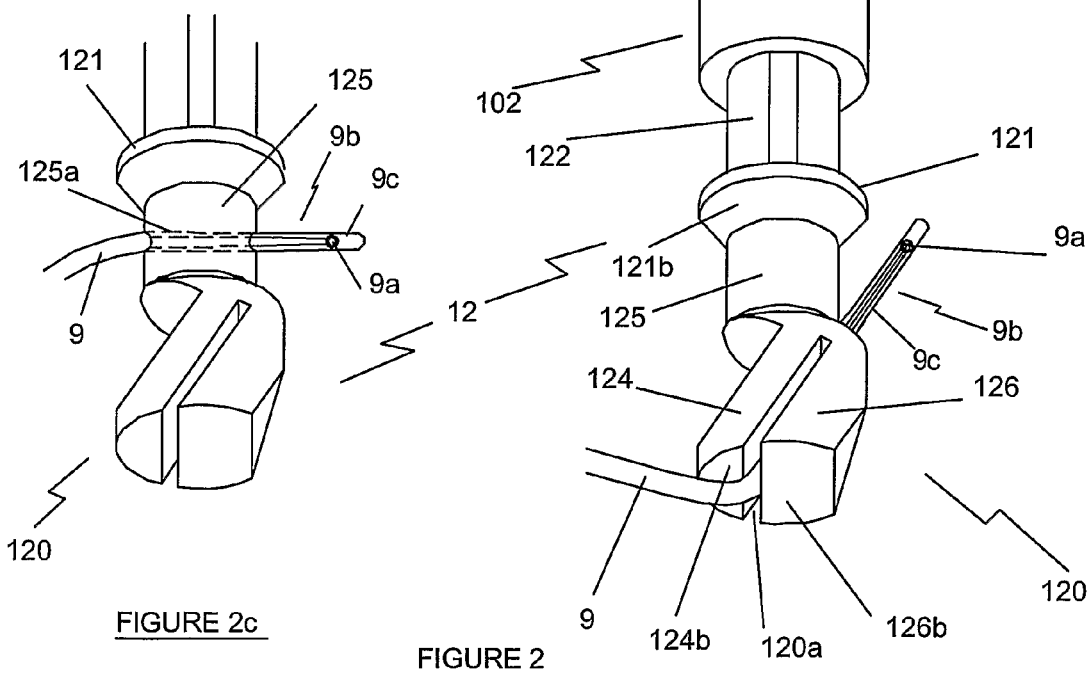
FIGURE 2a
FIGURE 2c
FIGURE 2

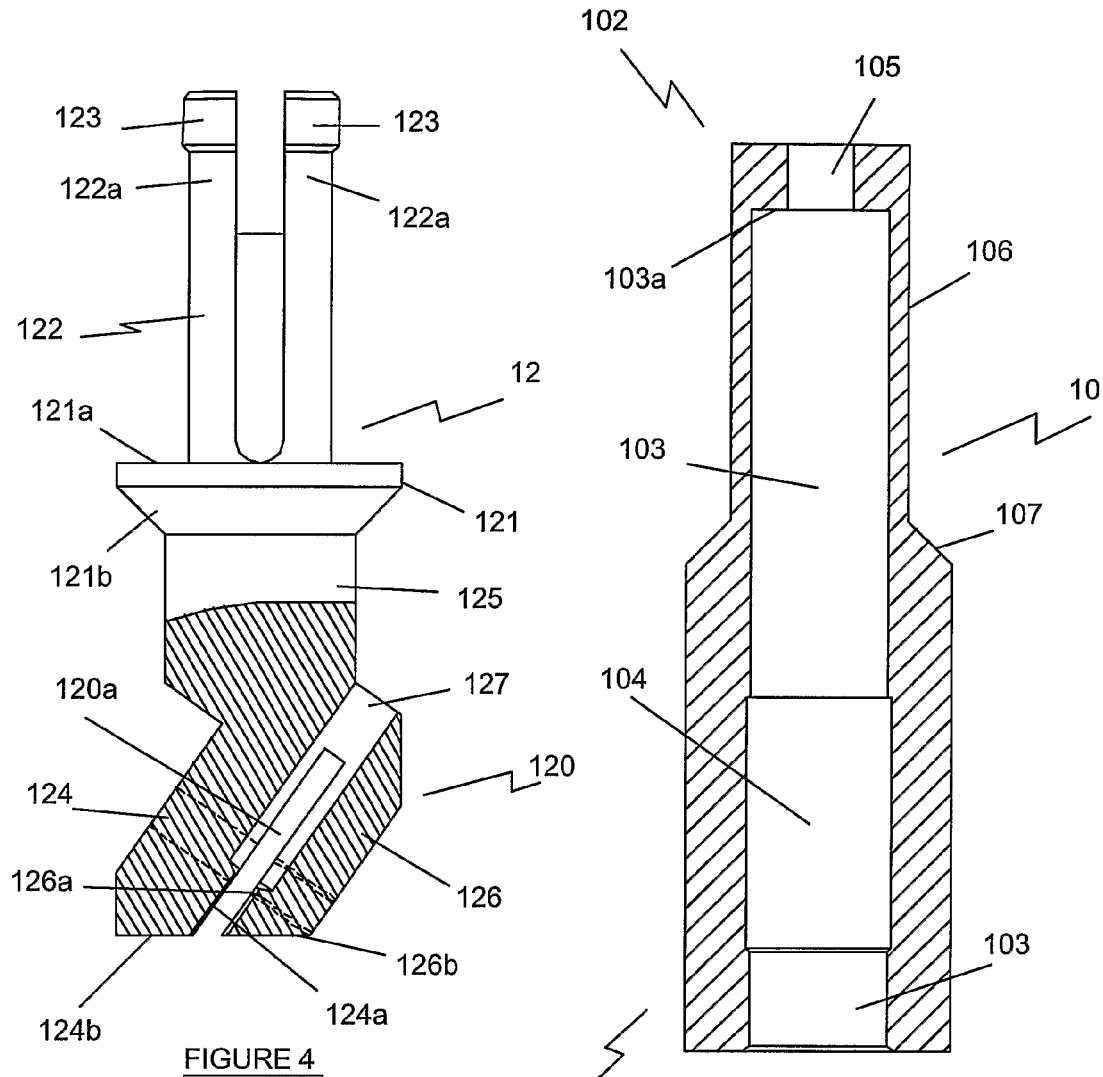
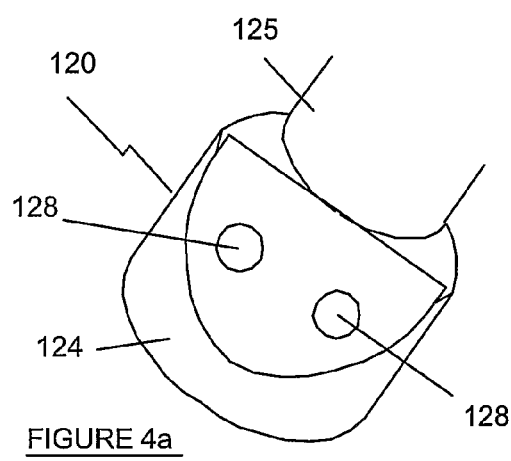
FIGURE 4
FIGURE 3
FIGURE 4a
FIGURE 4b

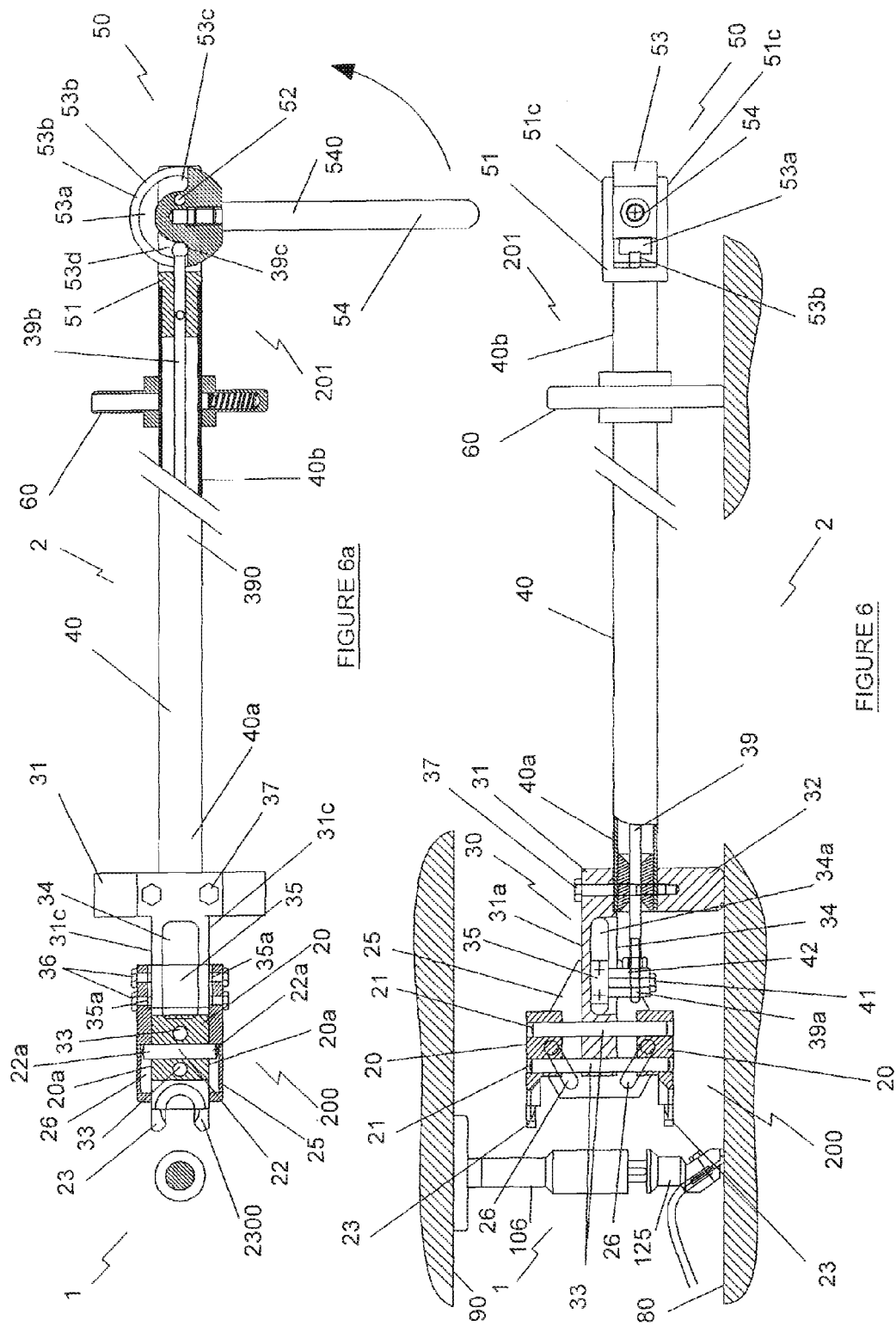

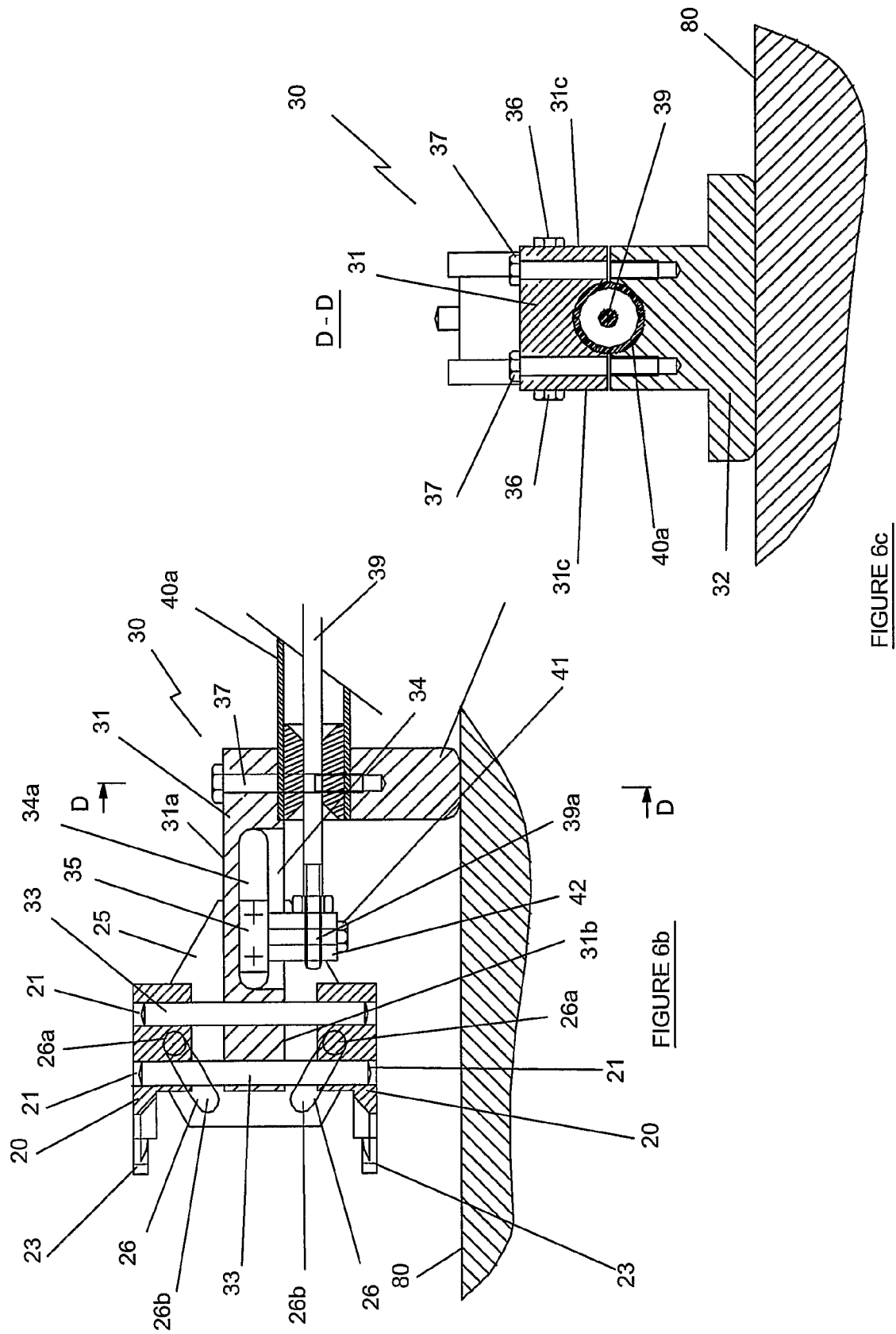

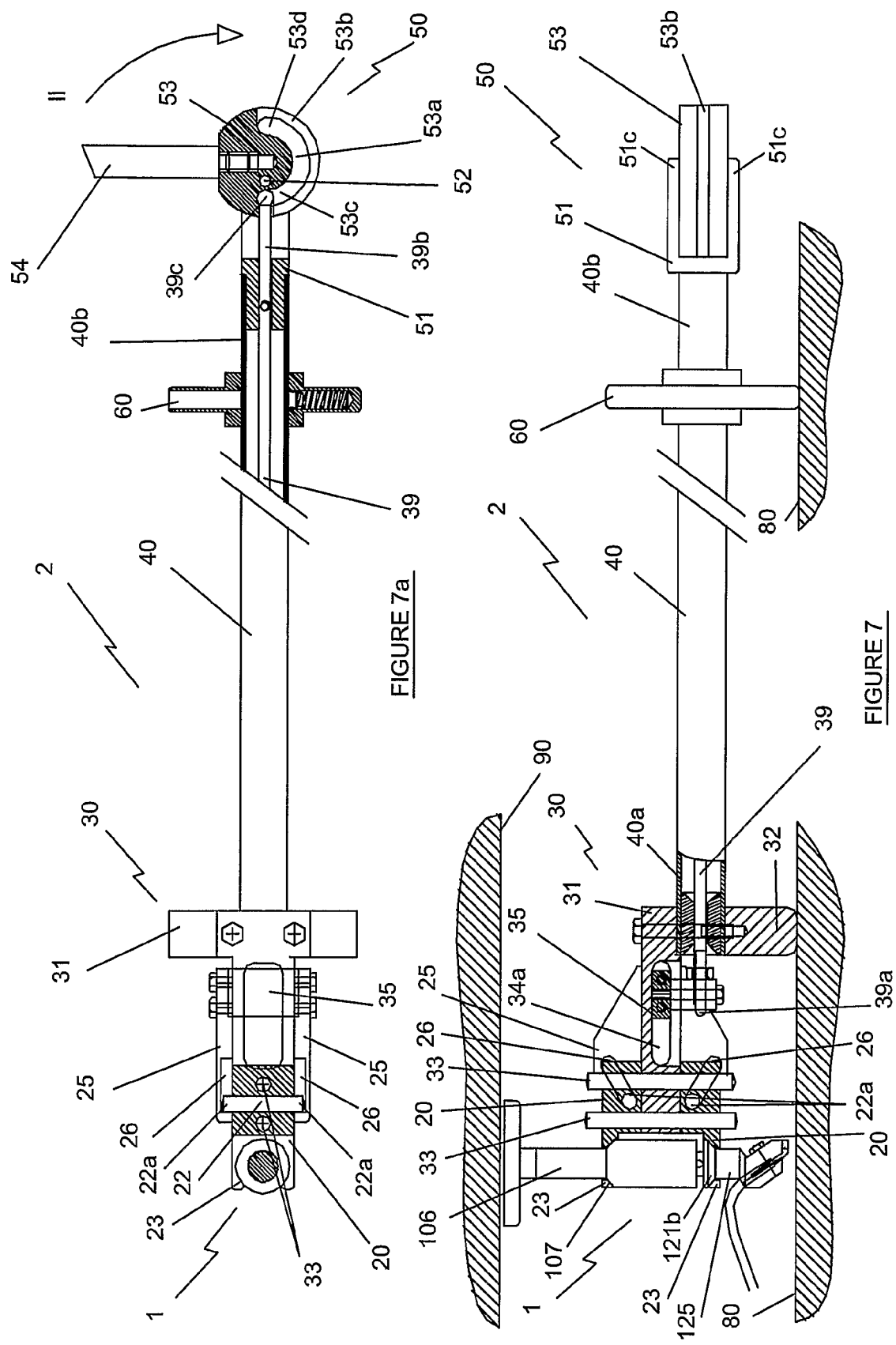

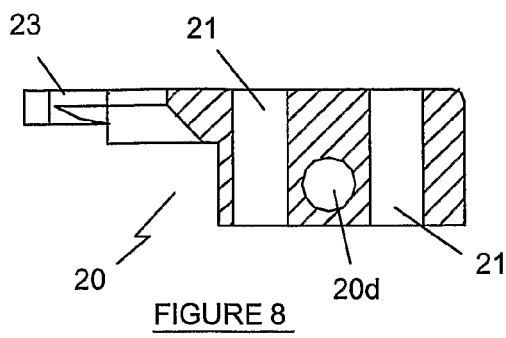
FIGURE 8
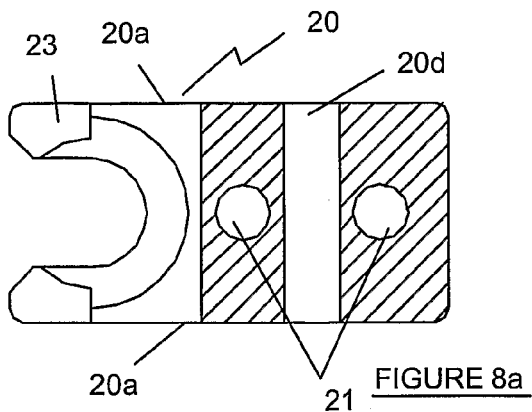
FIGURE 8a
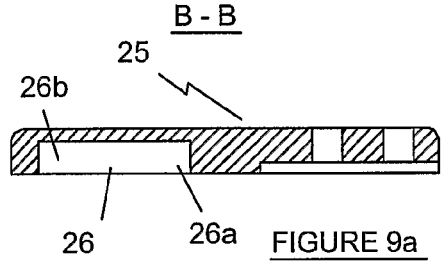
FIGURE 9a
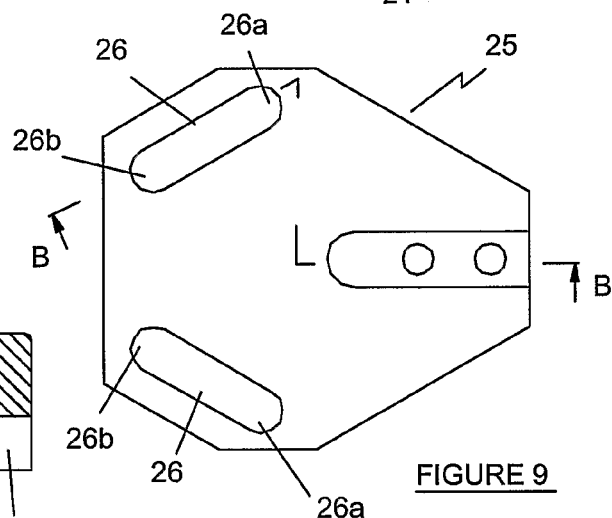
FIGURE 9
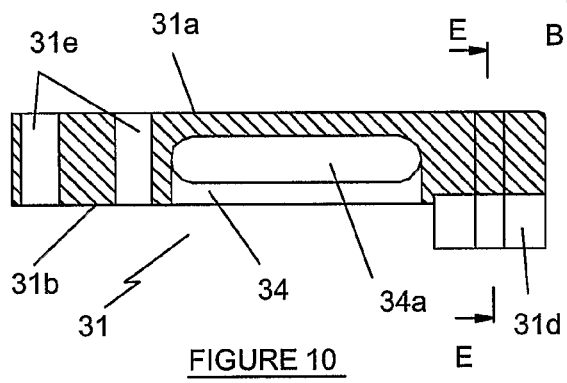
FIGURE 10
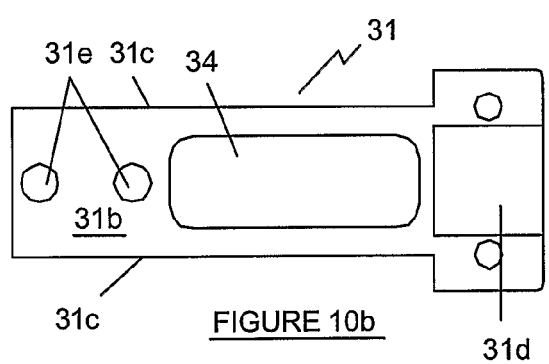
FIGURE 10b
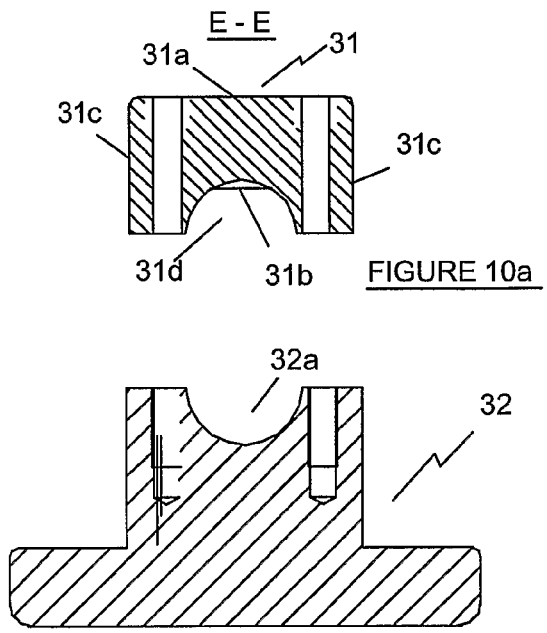
FIGURE 10a
FIGURE 11
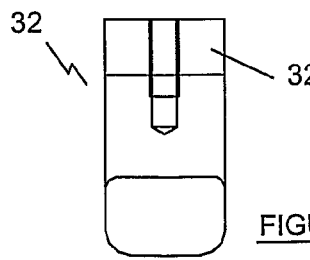
FIGURE 11a

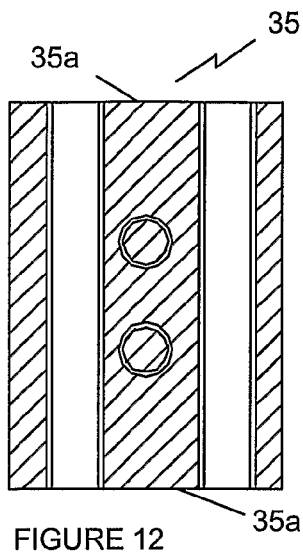
FIGURE 12
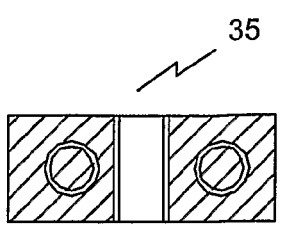
FIGURE 12a
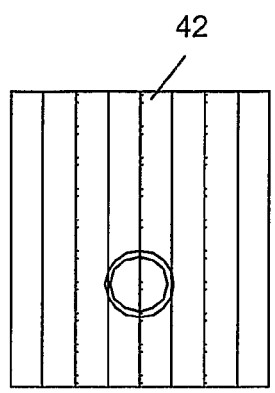
FIGURE 13
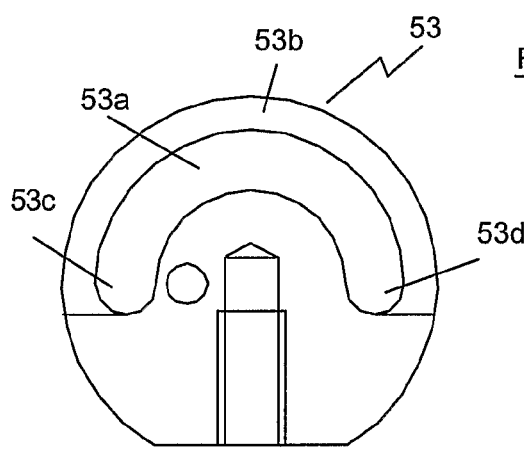
FIGURE 13a
FIGURE 15
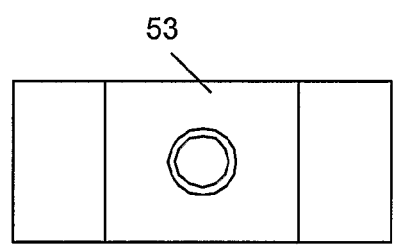
FIGURE 15a
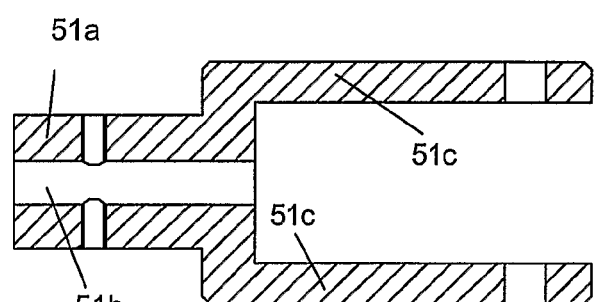
FIGURE 14a
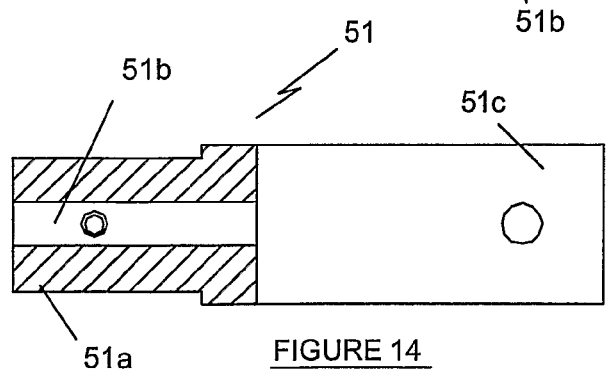
FIGURE 14

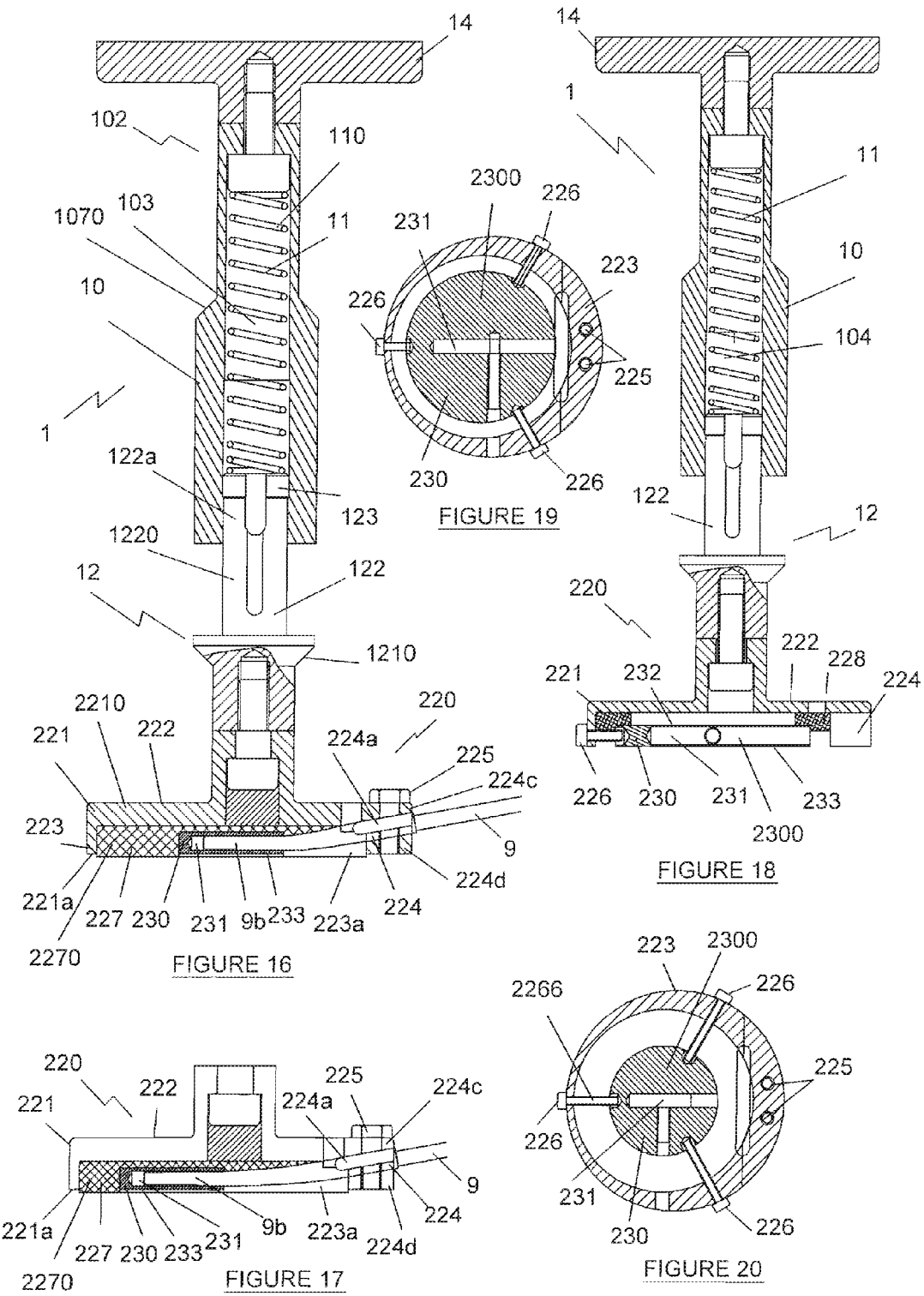

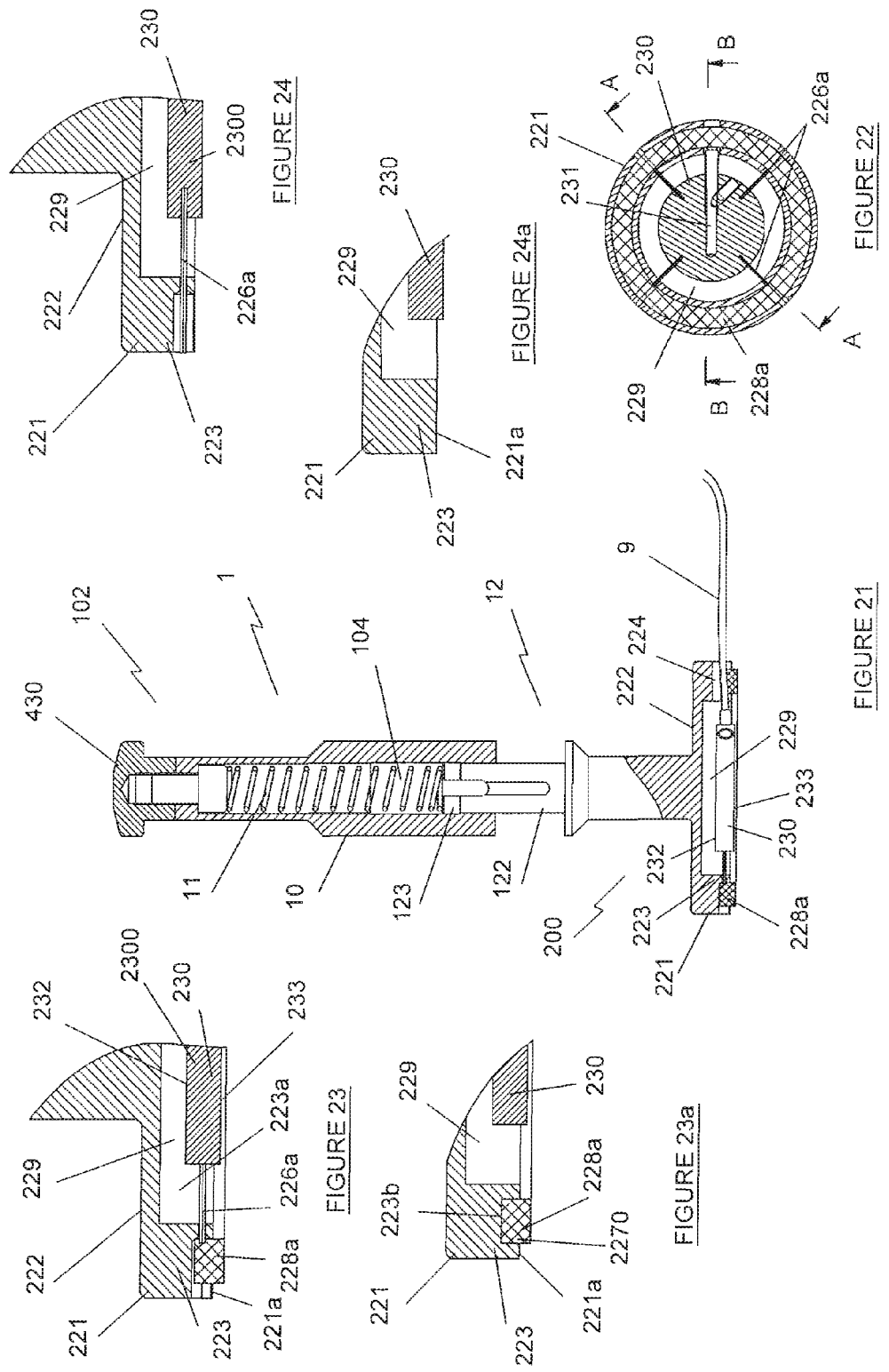

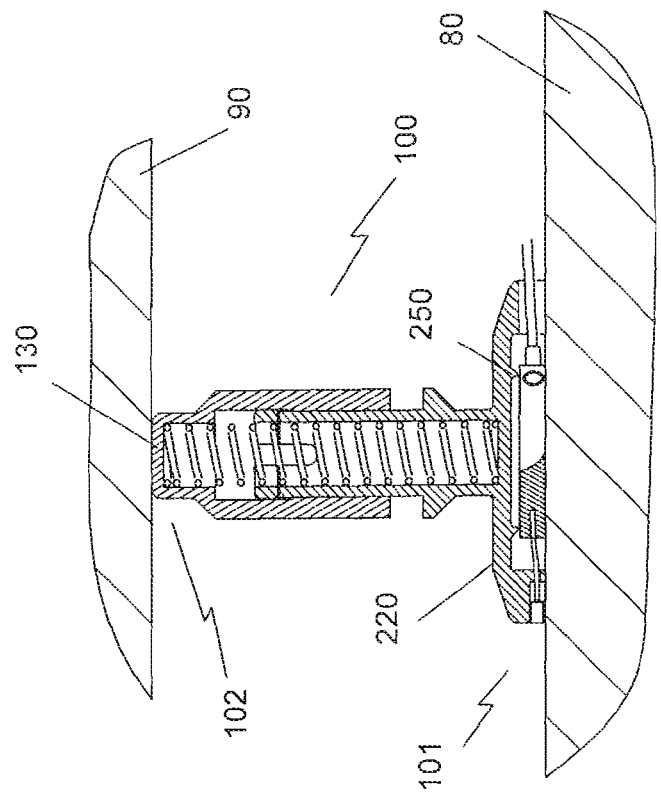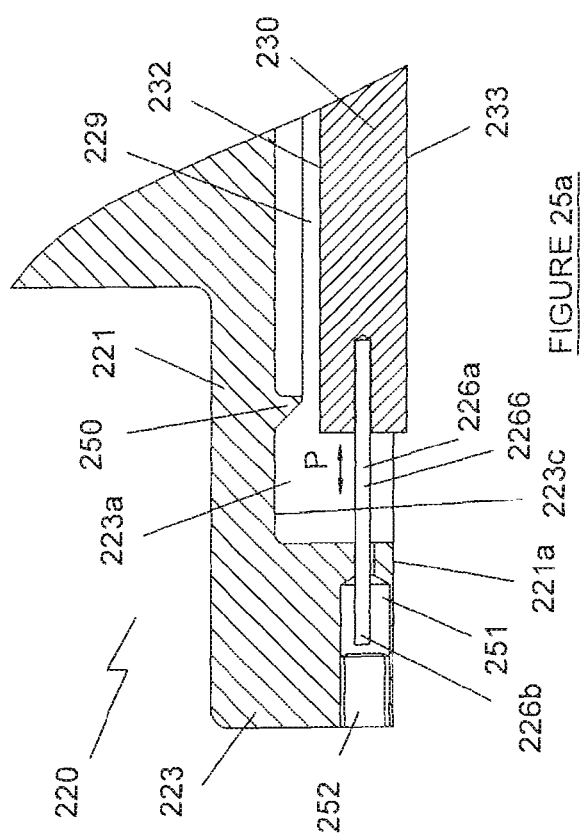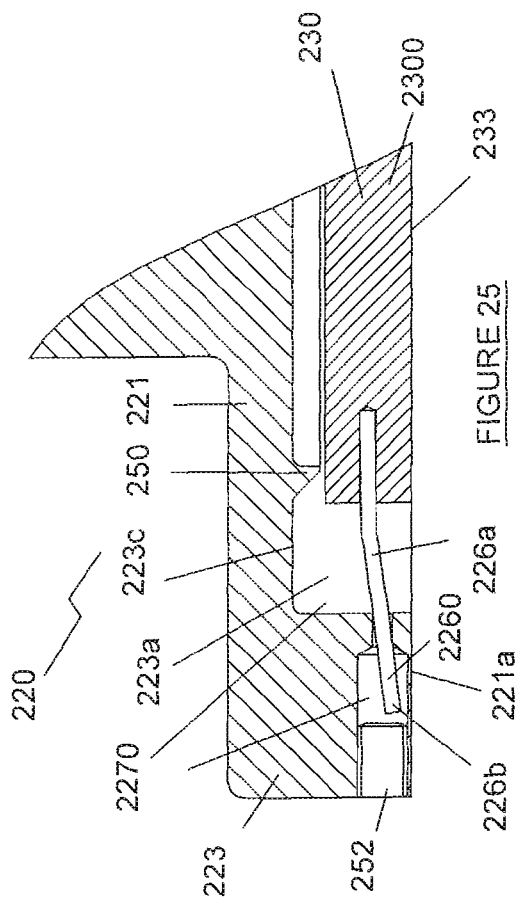

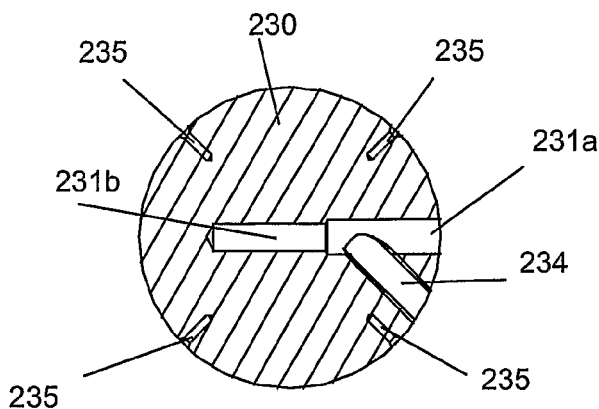
FIGURE 27
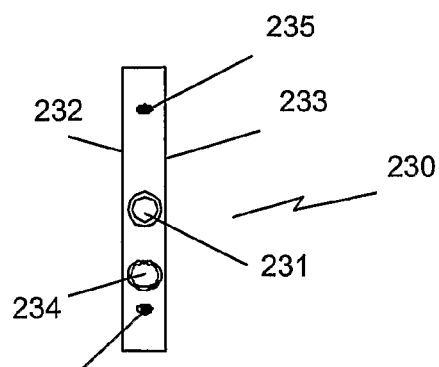
FIGURE 28
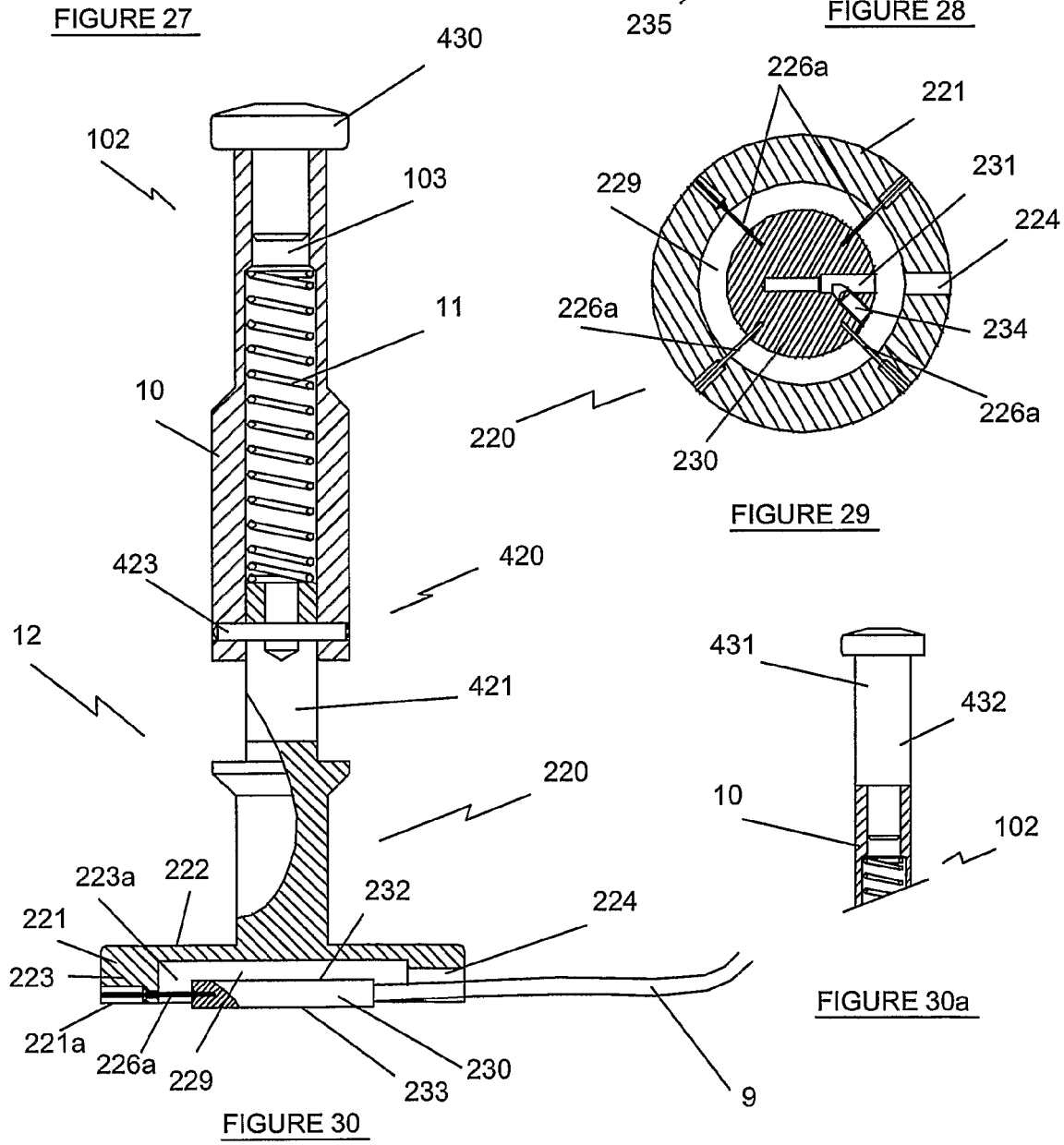
FIGURE 29
FIGURE 30
FIGURE 30a

HOLDER AND A PLACEMENT TOOL THEREFOR

CROSS-REFERENCE TO RELATED APPLICATIONS

This application is the National Stage of International Application No. PCT/US2005/030525, filed Aug. 26, 2005, which claims the benefit of U.S. Provisional Application Nos. 60/605,303, filed Aug. 27, 2004, and 60/636,386, filed Dec. 15, 2004, the contents of which are incorporated by reference herein.

FIELD OF THE INVENTION

The present invention relates to a holder and a placement tool therefor, and in particular, to a holder for clamping a conduit, such as an electric wire, to a surface and to a tool for putting the holder in place.

BACKGROUND OF THE INVENTION

The present invention concerns the problem of positioning and retaining conduits, for example electrical conductors, in contact with a surface, such as, for example, a shelf surface which is spaced apart from another shelf or other surface. For example, in pharmaceutical, biotechnological or food industries, validation and accountability of equipment are vital in view of strict standards applicable in these industries. Such equipment often comprises isolation chambers in which specific conditions, such as sterility, certain temperature or pressure levels, must be maintained during the manufacturing process or a part of it. Validation of such equipment involves introducing various electronic measuring devices to ensure that the equipment provides the required conditions. For example, in a lyophilization process, products are placed on a shelf within the isolation chamber of the lyophilizer. The products are initially frozen and then dried under vacuum while heat is transferred by thermal conduction from the shelves to the product. Accurate temperature and pressure values must be maintained in the chamber in order to achieve high quality products. For validation of lyophilisation equipment, series of thermocouples are employed in a plurality of locations within the chamber to measure the temperature of the shelves. Insulated wires of the thermocouples sealingly pass through a bulkhead which separates the surrounding atmosphere and the chamber. The measuring tips of the thermocouples are positioned in various locations in the chamber in contact with the shelf surfaces. Electric current produced by the thermocouples during measurements is very low and highly dependent on thermal conductivity between the tip and the shelf. It is therefore vital to maintain close contact of the measuring tips with the shelves throughout the validation process in order to register reliable measurements. In some applications, measurement tips of thermocouples are suspended above and/or below the shelves for taking and recording measurements of air temperature at various locations in the chamber. In this case it is necessary to ensure that the suspension state of a measuring tip of a thermocouple is maintained undisturbed throughout the validation process and that no contact between the measuring tip and a shelf surface or any other object within the isolated chamber occurs.

Many other processes, including but not limited to sterilisation processes, equally require validation of the internal condition in the isolation chamber by introducing thermally-responsive conductors into the chamber. In each case, it is necessary to ensure that working ends of sensors remain stationary and/or that thermal conductivity between working ends and examined surfaces remains constant.

Other examples of processes which may involve use of thermally-responsive conductors in an isolated chamber include processes such as heating of products in dry heat ovens, autoclaving or, indeed, freezing, steaming or pasteurisation processes.

Another problem related to placement of a sensor-tipped conductor into an isolation chamber is locating and fixing the sensor tip on a surface of a shelf, especially in a relatively inaccessible region of the surface.

A known approach to place and anchor a sensor tip of a conductor to a surface e.g. a shelf surface in a lyophilizer or an autoclave involves manually accessing the required location in the chamber and mere taping of the sensor tip to the shelf surface. Additionally or alternatively, a thermoconductive paste can be placed between the sensor tip and the examined surface. The disadvantage of such an approach is that the configuration of some isolation chambers renders them unsuitable for easy manual access. For example, in autoclaves the vertical distance between shelves is variable. In some typical application, this distance can be about 120 mm. The shelf size can be about 0.91 m by 1.52 m (3 by 5 feet) making it rather difficult for an operator to position and anchor a sensor tip of a conductor in the distal regions of the shelf surface. Another disadvantage of this known method is that tape does not always provide the required, reliable, effective contact between a sensor tip and a shelf surface, resulting in poor thermal conductivity and hence inaccurate readings. A still further disadvantage of this method lies in the necessity for cleaning shelf surfaces after a validation process cycle is complete so as to remove the adhesive and/or the thermoconductive paste which remains on the shelf surface after a sensor tip has been removed. This adds to the risk of compromising aseptic conditions which must be met for a particular process and also takes time during which the equipment is unavailable for use.

A thermocouple anchor is supplied by KRP Validation Services, Inc. of Manteno, Ill., United States of America for placing and retaining a sensor tip of a thermocouple on a shelf of a lyophilizer. The anchor is extendable between two shelves. It comprises two portions, each of which has a surface for bearing against a shelf, the portions being connected by a screw which is operable to adjust the distance between the bearing surfaces. One of the portions can receive a thermocouple. The anchor is placeable between the shelves and adjustable by the screw to retain the anchor between the shelves. A spring mechanism is also provided to permit fine adjustment so as to provide firm contact of the bearing surfaces with the shelves.

A disadvantageous feature of this device is that adjustment of the height of the anchor tool must be carried out prior to its placement between the shelves and must be accurate enough so as not to over-extend the device thus making positioning of the tool difficult. The tool is designed so that the adjusted height will only allow for holding the tool in place and will not provide sufficient pressure towards the sensor tip so as to maintain stable thermal conductivity between the tip and a shelf surface. Furthermore, positioning of the device between the shelves is carried out as the bearing surfaces slide along the corresponding shelf surfaces.

Another problem associated with such an anchor tool is that during cycles of a validation process, shelves of a lyophilizing apparatus are subjected to substantial thermal fluctuations between about −70° C. and +130° C. and therefore expand or contract in accordance with the change of temperature. This exerts undesirable effects on the performance of the anchor tool and in particular can compromise the effective pressure exerted on a conduit from the shelf surface and the clamping piece between which the conduit is retained.

U.S. Pat. No. 4,527,005 (McKelvey et al) discloses a spring-loaded thermocouple module which includes a cup-like holder in which an insulation member is movably received. The insulation member further has passages for receiving a pair of thermocouple wires which join together into a weld bead outside the insulation member. A spring is loaded into the cup-like holder to be held captive within the holder and the spring is operable to apply a bias force to the weld bead through the insulation member. The cup-like holder has a thread on its outside surface for threading the holder into a blind opening of a specimen. When the holder is installed in the specimen, the weld bead is held in contact with the end wall of the blind opening of the specimen by the bias force of the spring.

SUMMARY OF THE INVENTION

It is an object of the present invention to seek to alleviate the aforementioned problems.

A holder for receiving a conduit comprising:
a first member having a first bearing surface;
a second member having a second bearing surface;
at least one of the first or second members including means for retaining a conduit; and a housing extending between the first and second members for accommodating a biasing means which is operable to bias the first and second members apart so that in use, the first and second surfaces are biased into engagement with a pair of surfaces of an external device so as to retain the holder between the pair of surfaces, the biasing means being compressable so as to reduce the distance between the first and the second bearing surfaces so that the distance therebetween is less than the distance between the pair of surfaces and wherein the holder comprises means for retaining the biasing means in a compressed mode during positioning of the holder between the pair of surfaces so that no bias force from the biasing means is applied to the pair of surfaces during the positioning operation. Such an arrangement permits the holder to be positioned between a pair of spaced apart surfaces of another device without the bearing surfaces of the holder catching on or sliding against the spaced apart surfaces.

Ideally, the housing defines the first member and comprises first and second ends and a channel extending between the ends, said channel being open at the first end of the housing and closed proximal the second end of the housing, the channel being defined by a side wall and a first end face proximal the second end of the housing, the housing further comprising a second end face on the exterior of the second end of the housing.

Preferably, the second member comprises a shaft having first and second ends, the second end having a third end face and said shaft being slidably receivable in the channel of the housing in use.

Preferably, the first bearing surface is defined by the second end face of the housing and the second bearing surface is defined by the third end face of the shaft.

Conveniently, the holder further comprises means for retaining the shaft in engagement with the housing.

Most preferably, the biasing means is disposed and retained in the channel between the first end face of the channel and the first end of the shaft and is operable to apply bias force to said first end face of the channel and the first end of the shaft so as to spread the housing and the shaft apart so that of the first and second bearing surfaces engage with a pair of surfaces of an external device so as to retain the holder between the pair of surfaces.

Ideally, the biasing means comprises a spring.

The means for retaining the shaft in engagement with the housing may comprise a plurality of prongs projecting axially about the first end of the shaft, each prong having an expanded head formed at the free end of the prong and each head having a top face; and a widened section of the channel formed intermediate the first and the second ends of the housing defining a chamber for receiving the expanded heads; the free ends of the prongs being flexibly movable relative each other to allow the expanded heads to be pressed together so as to enable the expanded heads to enter the channel through the opening of the first end of the housing and to advance towards the chamber; the material of the prongs being sufficiently resilient so as to allow the prongs to spread apart upon release, when the expanded heads have entered the chamber, so that the heads are retained in the chamber.

Alternatively and most preferably, the means for retaining the first end of the shaft in the passage comprises at least one follower member extending transversely in the channel of the housing in the region of the first end of the housing; at least one guide slot formed axially in the body of the shaft about the region of the first end of the shaft, the guide slot being sized for engaging with the follower member when the region of the shaft containing the guide slot is disposed in the channel; wherein the engagement of the at least one follower member and the at least one guide slot permits axial travel of the shaft in the channel of the housing between first and second end positions; and the follower member is operable to engage regions of the shaft defining the guide slot when the shaft reaches the first and second end positions thus preventing the shaft from travelling beyond said positions and retaining the shaft in engagement with the housing.

The means for retaining a conduit may comprise:
a pair of jaws projecting from the second end of the shaft, each jaw having an inner surface, said inner surfaces of the jaws facing each other;
the jaws being movable relative each other so as to draw the inner surfaces together or to spread them apart;
a slot defined by a space between the inner surfaces of the jaws;
a through-duct extending between the exterior of the shaft and the slot so that a conduit can enter the slot through said through-duct and exit the slot about the third end face and vice versa; and
means for pressing the jaws together to retain a conduit between the inner surfaces of the jaws.

The means for pressing the jaws together may preferably comprise a pair of fastening elements and a pair of respective bores formed transversely through the jaws for receiving the fastening elements.

Alternatively the means for retaining a conduit may comprise a through-bore suitably shaped for receiving a conduit, said through-bore being formed across the body of the shaft.

Most preferably, the means for retaining a conduit comprise:
a block provided at the second end of the housing and/or the second end of the shaft, the block having at least one contact surface for contact with a surface of an external device, the block being made from heat conductive material;
a channel connecting the exterior and interior of the block, the channel being suitably shaped for receiving a conduit and the channel being formed with sufficient amount of block material surrounding the channel along its length so as to enable heat conduction evenly from the block to a conduit disposed in the channel.

Conveniently, the holder is provided with means for retaining the block at the second end of the housing and/or the second end of the shaft.

Ideally, means are provided for securely fastening the conduit in position within the block.

Preferably, the means for retaining the block at the second end of the housing and/or the second end of the shaft comprise:
  a receiver portion comprising a base surface, the base surface comprising the first and/or the second bearing surface;
  a recess formed in the base surface of the receiver portion for disposing the block therein;
  a passage for receiving a conduit, the passage extending between the exterior of the receiver and the recess; and
  fastening means for holding the block in the recess.

Ideally, the fastening means comprise a plurality of springs extending between the block and the inner surfaces of the receiver which define the recess, the springs being arranged so that the portion of the block which contains the contact surface projects proud in relation to the base surface of the receiver when the bias means of the holder is in a released mode.

Advantageously, the block is provided with means for biasing the contact surface of the block into contact with a surface of a separate device.

Preferably, the biasing means of the block comprise the springs, wherein the springs are operable to deform upon engagement of the base surface of the receiver with a surface of an external device so as to bring the contact surface of the block from position proud in relation to the base surface of the receiver to a position at least flush with the base surface.

Conveniently, radially extending bores may be formed in the wall of the receiver each bore, each bore having an inwardly facing end and an outwardly facing end. A free end of one of the springs may be accommodated at the end of the bore proximal the bore's inwardly facing open-end and a plug member is provided to be received in the bore through the outwardly facing open end in order to prevent displacement of the spring along its longitudinal axis.

Alternatively, the fastening means comprise: a plurality of rigid fastening members extending between the inner surfaces of the receiver which define the recess and the block, the fastening members and the block being mutually arranged so that the portion of the block which contains the contact surface is flush with the base surface of the recess when the holder is in a released mode.

Advantageously, a thermal insulation means is provided substantially around all parts of the block except for the contact surface of the block so as to prevent thermal exchange between those parts of the block and the surrounding atmosphere.

Ideally, the thermal insulation means is provided either by a non-conductive gas or gaseous mixture or a vacuum in a gap between the exterior of the block and the inner surface or the receiver which defines the recess.

Optionally, the thermal insulation means comprise an insulating pad made from suitable material having thermo-insulative properties, the insulating pad being sized and shaped to be retainably disposed in the recess of the receiver and the pad having an indent shaped for receiving the block.

Optionally, the means for retaining the block in the recess comprise the insulating pad the thermo-insulative material of which is elastically deformable and the indent is formed to fit tightly around the block upon receiving the block therein, thus retaining the block in position in the receiver, and wherein the contact surface of the block is either flush with or projects proud from the base surface of the receiver.

Optionally, an auxiliary insulation means is provided at the base surface or the receiver so that in use of the holder, when the base surface is engaged with a surface of a separate device, to prevent thermal exchanges between the interior of the recess and the surrounding environment.

Conveniently, at least one stopper member is disposed in the recess of the receiver the stopper member being spaced from the external surfaces of the block when the block is in the position in which the biasing means is deformed and the contact surface of the block is at least flush with the base surface of the receiver, the spacing being such that when the block is brought into abutment with the stopper member by further deformation of the biasing means, the resilient properties of the biasing means remain unaffected. Over-deformation of the biasing means may for example result in partial loss of resilience of the biasing means of the block such that the block may not return into the position in which the contact surface of the block projects proud from the base surface of the receiver upon withdrawal of deformation forces from the biasing means. Over-deformation may also affect subsequent conductive performance of the block because the contact surface of the block will not be in a sufficient abutment with the surface of another device. The provision of the stopper member provides control over the degree of the deformation of the biasing means by stopping the block in a pre-determined position within the receiver.

In a preferred embodiment, the inner surfaces defining the recess include a base wall remote from the opening of the recess and the stopper member comprises a protrusion projecting from the base wall towards the opening of the recess to a pre-determined distance so as to stop the block in the pre-determined position.

The protrusion may be in a form of a substantially endless ridge. In one embodiment, the protrusion may be in a form of an annular ridge but it will be appreciated that the stopper member may have any suitable configuration which would prevent the block from moving too far beyond the predetermined position so as to avert over-deformation of the biasing means.

Ideally, the block is in a form of a disc having a first and second substantially planar parallel surfaces and a circumferential surface substantially perpendicular to the first and the second surfaces and wherein the contact surface is one of the two substantially planar surfaces.

Preferably, the first and second members are adapted to engage with respective gripping means of a placement tool.

Ideally, the housing and the shaft each have a shoulder on the exteriors of the housing and the shaft.

In another aspect the invention provides a placement tool for the described above holder comprising:
  a gripping means operable to engage with the first and the second members of the holder and to press said first and second members together against the bias of the biasing means;
  the gripping means being further operable to release and disengage from the holder so as to allow the biasing means to release and thereby bias the first and second members apart;
  handle means disposed remote from the gripping means for operating the gripping means;
  the handle means being connected to the gripping means via a linkage means; and a housing for at least partially accommodating the linkage means.

Preferably, the gripping means comprises:
a pair of gripping jaws movably mounted on a support block;
the gripping jaws being movable between an open position in which the gripping jaws are most spread-apart from each other and a closed position in which the gripping jaws are closest each other.

Ideally, the housing comprises a tube having distal and proximal ends and a passage extending between the ends, the tube being coupled with the support block at its distal end and with the handle means at its proximal end.

Preferably, the linkage means comprises:
a connecting rod which in use is disposed in the passage of the housing, the connecting rod having distal and proximal ends, said rod being connected to the handle means at its proximal end, and said rod being axially movable in the housing by the handle means between a most distal position and a most proximal position;
the connecting rod being connected to the griping jaws via a series of kinematic pairs operable to transform axial movement of the connecting rod, upon operating the handle means, so as to move the gripping jaws between the open and the closed positions.

Ideally, the series of kinematic pairs comprises:
at least one first link element movably mounted on the support block, the joint element being movable together with the connecting rod;
at least one second link element provided at each of the gripping jaws;
the second link elements of each of the gripping jaws being engaged with the at least one first link element, so that movements of said first link element result in the gripping jaws moving towards each other or spreading apart.

BRIEF DESCRIPTION OF THE DRAWINGS

The invention will now be described with reference to the accompanying drawings which show, by way of example only, embodiments of a holder device and a placement tool therefor according to the invention. In the drawings:

FIG. 1 is a perspective view of a preferred embodiment of the spring-loaded holder according to the invention showing an end of a thermocouple fastened to the holder with a weld bead of the thermocouple to be anchored to a surface;

FIG. 1a is a second perspective partial view of the spring-loaded holder of FIG. 1;

FIG. 2 a perspective view of a preferred embodiment of the spring-loaded holder according to the invention showing an end of a thermocouple fastened to the holder with a weld bead of the thermocouple to be suspended above a surface;

FIG. 2a is a second perspective partial view of the spring-loaded holder of FIG. 2;

FIG. 2c is a perspective partial view of the spring-loaded holder modified specifically for receiving a thermocouple for suspending a weld bead thereof above a surface;

FIG. 3 is a cross-sectional elevation of a housing of the preferred embodiment of the spring-loaded holder;

FIG. 4 is a partially cross-sectional elevation of an anchor shaft of the preferred embodiment of the spring-loaded holder;

FIG. 4a is a perspective partial view of the anchor shaft of FIG. 4;

FIG. 4b is a plan view of the anchor shaft of FIG. 4;

FIG. 6 is a partially cross-sectional front view of a preferred embodiment of the placement tool according to the invention in an open state;

FIG. 6a is a partially cross-sectional plan view of the placement tool of FIG. 6;

FIG. 6b is a cross-sectional front view of a distal portion of the placement tool of FIG. 6;

FIG. 6c is a cross-sectional view of the distal portion of the placement tool of FIG. 6b along the lines D-D;

FIG. 7 is a partially cross-sectional front view of a preferred embodiment of the placement tool according to the invention in a closed state;

FIG. 7a is a partially cross-sectional plan view of the placement tool of FIG. 7;

FIG. 8 is a cross-sectional elevation of a gripping jaw of the placement tool according to the invention;

FIG. 8a is a plan view of the gripping jaw of FIG. 8;

FIG. 9 is a front view of a cam plate of the placement tool according to the invention;

FIG. 9a is a cross-sectional view of the cam plate of FIG. 9 along the lines B-B;

FIG. 10 is a cross-sectional elevation of a support plate of the placement tool according to the invention;

FIG. 10a is a cross-sectional view of the support plate of FIG. 10 along the lines E-E;

FIG. 10b is a bottom view of the support plate of FIG. 10;

FIG. 11 is a cross-sectional elevation of a foot of the placement tool according to the invention;

FIG. 11a is a side view of the foot of FIG. 11;

FIG. 12 is a plan cross-sectional view of a traveller of the placement tool according to the invention;

FIG. 12a is a cross-sectional side view of the traveller of FIG. 12;

FIG. 13 is a front view of a connector of the placement tool according to the invention;

FIG. 13a is a side view of the connector of FIG. 13;

FIG. 14 is a cross-sectional elevation of a fork of the placement tool according to the invention;

FIG. 14a is a cross-sectional plan view of the fork of FIG. 14;

FIG. 15 is a plan view of a disc of the placement tool according to the invention;

FIG. 15a is a side view of the disc of FIG. 15;

FIG. 16 is a cross-sectional elevation of an alternative spring loaded holder having an alternative and most preferred head arrangement for forming the contact between the thermocouple and the shelf;

FIG. 17 is a cross-sectional elevation of a first variant of the head arrangement of FIG. 16;

FIG. 18 is a cross-sectional elevation of an alternative spring loaded holder having a second variant of the head arrangement of FIG. 16;

FIG. 19 is a cross-sectional plan view of the head of FIG. 18 showing a channel formed in a conductive disc of the head;

FIG. 20 is a cross-sectional plan view similar to FIG. 19, showing a variation in the size and securement of the conductive disc;

FIG. 21 is a cross-sectional elevation of a holder similar to that of FIG. 16 and having a third variant of the head arrangement;

FIG. 22 is a plan cross-sectional view of the head of FIG. 21 showing the channel formed in the conductive disc;

FIG. 23 is a partial cross-sectional view of the head of FIG. 22 taken along the line A-A in FIG. 22 and FIG. 23a is similar to FIG. 23 but taken along the line B-B in FIG. 22;

FIGS. 24 and 24a are views similar to FIGS. 23 and 23a, but the head is formed without a groove for the foam;

FIG. 25 is a cross-sectional view of a variation of the head of FIG. 24 having a stopper member for preventing over-deformation of spring wires which hold the disc showing the disc aligned with the base of the head;

FIG. 25a is a cross-sectional view of the head of FIG. 25 showing the disc projecting outwardly beyond the base of the head;

FIG. 26 is a cross-sectional elevation of a spring-loaded holder according to the invention having a head of FIGS. 25 and 25a.

FIGS. 27 and 28 are a cross-sectional plan and a side views of the disc respectively;

FIG. 29 is a sectional view of the disc of FIGS. 27 and 28 secured in the head of FIGS. 25 and 26;

FIG. 30 is a cross-sectional elevation of a holder having a screw arrangement for connecting the moving parts of the holder;

DETAILED DESCRIPTION OF PREFERRED EMBODIMENTS

Figures 1B, 1C:
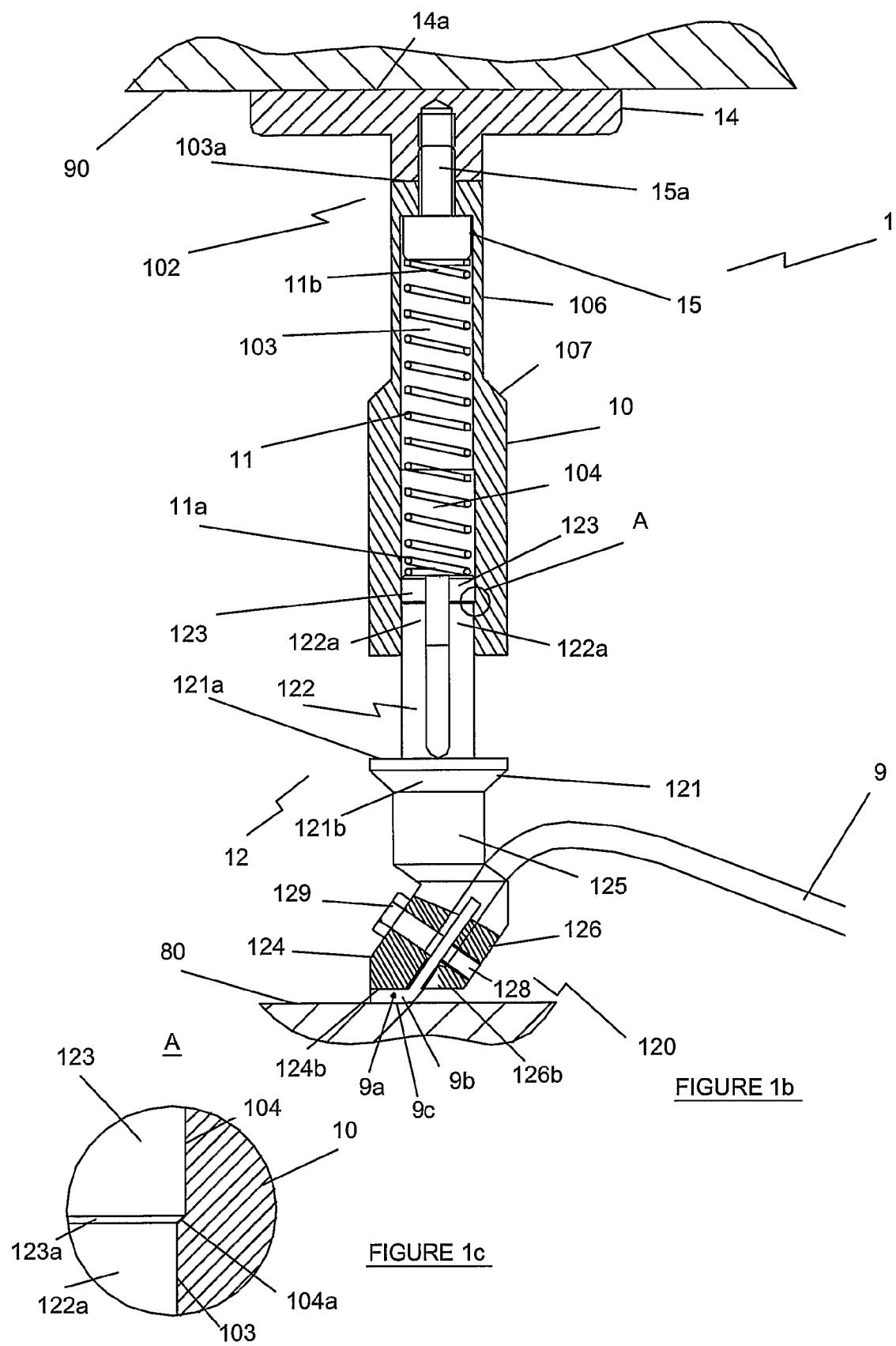
FIG. 1b is a cross-sectional elevation of the spring-loaded holder of FIG. 1.
FIG. 1c is an enlarged view of area A of FIG. 1b.
Figure 5:
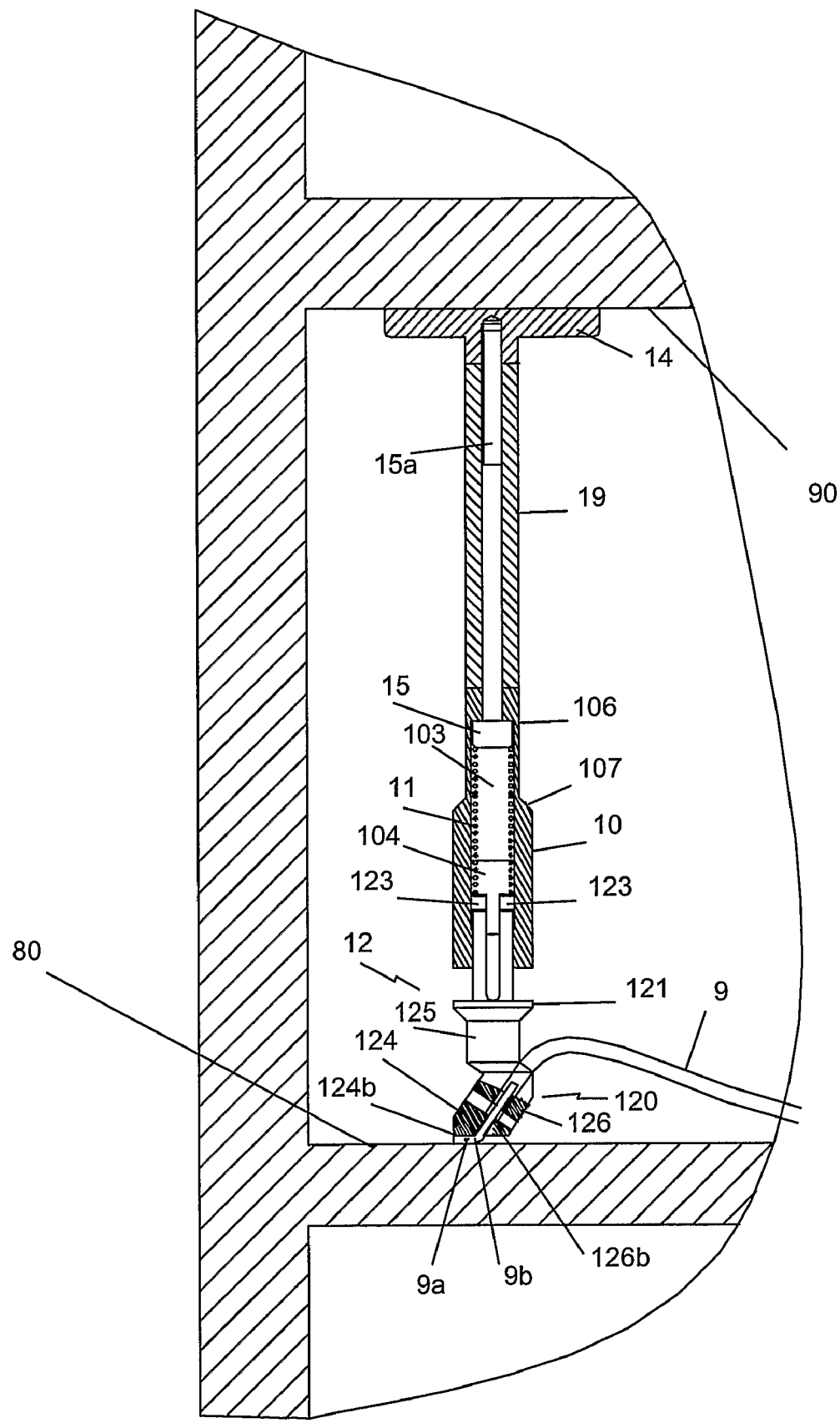
FIG. 5 is a cross-sectional elevation of an extended spring-loaded holder according to the invention.
Figure 31:
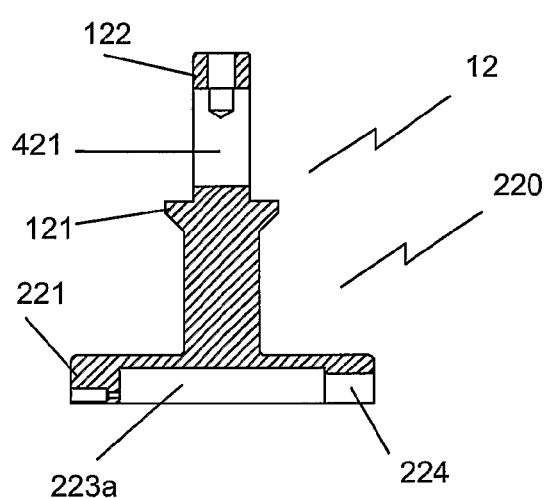
FIG. 31 is a cross-sectional elevation of the anchor shaft of the holder of FIG. 30.
Figure 32:
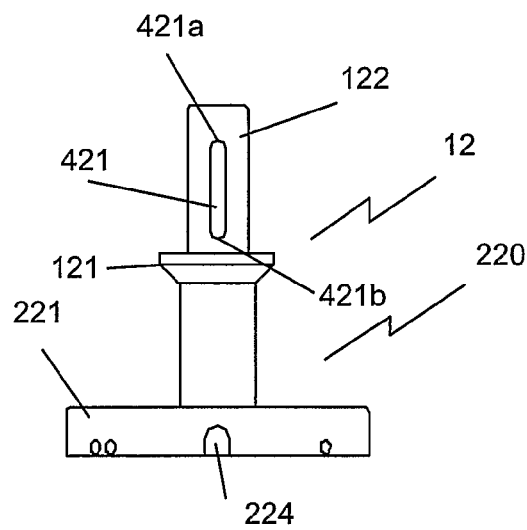
FIG. 32 is an elevation of the anchor shaft of FIG. 30.
Figure 33:
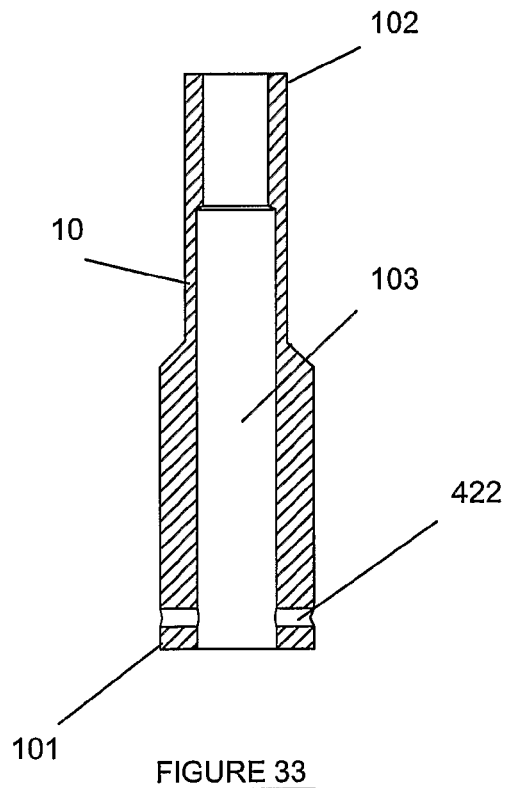
FIG. 33 is a cross-sectional elevation of the housing of the holder of FIG. 30.
Figure 34:
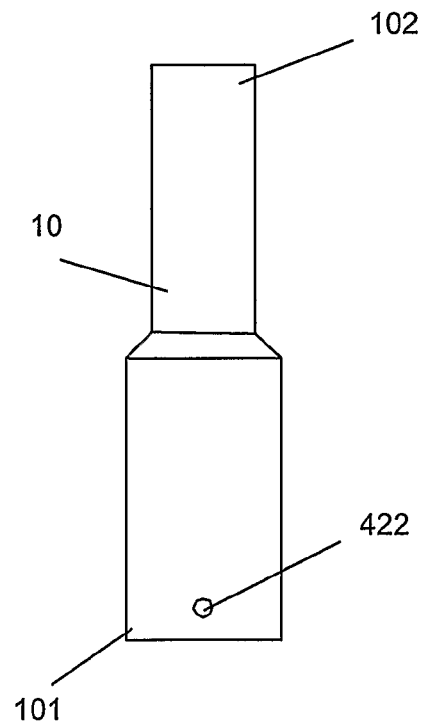
FIG. 34 is an elevation of the housing of FIG. 30.

One embodiment of the spring-loaded holder and the placement tool therefor according to the invention will now be described with reference to the drawings. The spring-loaded holder is indicated generally by reference numeral 1 and the placement tool is indicated generally by reference numeral 2. The spring-loaded holder 1 will be described by example in an application for its use in a lyophilizing apparatus and more specifically for extending and clamping the holder between spaced-apart shelf surfaces 80 and 90 of the lyophilizing apparatus and/or holding a weld bead 9a of an insulated thermocouple 9 in positive contact with the shelf surface 80 or 90 (see FIGS. 1b and 5) in a vacuum chamber of the lyophilizer. In another aspect, the invention will be described as adapted for suspending a weld bead 9a relative shelf surface 80 or 90. The weld bead 9a of a commercial thermocouple may be covered with a thermally transparent protective sheath 9c (FIG. 1b). Such sheaths are typically used in commercially available thermocouples. The holder 1 can also extend and clamp between surfaces of a top shelf and a roof in a lyophilizing apparatus or surfaces of a bottom shelf and a floor of such an apparatus. It is to be understood that the invention is not in any way limited to use in such an apparatus and in fact has application for use in any apparatus in which lines, conductors, piping or other conduits are to be led, for any suitable reason, to a use location, and in which said lines, conductors, piping or other conduits are to be held in contact with or suspended relative to a surface which is spaced apart from another surface in the apparatus.

Referring to FIGS. 1 to 5, spring-loaded holder 1 comprises an elongate tubular housing 10 having a first end 101 and a second end 102 and a channel 103 extending between the ends, the channel having an end face 103a proximal the second end 102 of the housing. The housing further comprises a neck 106 and shoulder 107. The holder 1 further comprises a spring 11 having a first end 11a and a second end 11b, and an anchor shaft 12. Both the spring 11 and the anchor shaft 12 are slidably receivable in the channel 103.

The housing 10 further comprises a foot 14 at its second end 102, the foot having an end surface 14a. The channel 103 has a section 104 which has a larger diameter than the diameter of the channel 103 and is formed intermediate the first and the second ends of the housing 10 as best shown in FIGS. 1c and 3.

The foot 14 in this embodiment of the invention is secured to the second end of the housing by a bolt 15. The bolt 15 is loaded into the channel 103 with the threaded shank 15a leading. The shank is then engaged with a threaded opening 105 (FIG. 3) at the second end 102 of the housing 10 so that a free end of the threaded shank 15a projects from the threaded opening 105. The foot 14 is then screwed tightly on to the free end of the shank 15a. It will of course be understood that other possibilities exist for securing the foot 14 to the housing, including forming it integrally with the housing.

The anchor shaft 12 comprises a head 120 for receiving and fastening an insulated thermocouple 9, a neck 125 and a collar 121 having a mating surface 121a and a shoulder 121b. A body member 122 projects proud of the mating surface 121. A pair of resiliently deformable prongs 122a extend from the free end of the body member 122.

Each prong 122a has an expanded head 123. The heads 123 are sized and shaped so as in use of the spring-loaded holder 1 to occupy the larger section 104 when the prongs 122a are relaxed so that the heads 123 can slidably move along the larger section 104 but cannot exit the section. In another aspect, the heads 123 are sized and shaped so as to be slidably movable in the channel 103 upon pressing the prongs 122a together. Each head 123 may be provided with a chamfer 123a defining a transitional conical surface between the larger heads 123 and the narrower prongs 122a. A matching shoulder 104a is formed in the larger section 104 defining a transitional conical surface between the narrower channel 103 and the larger section 104. When the heads 123 occupy the larger section 104, the prongs 122a are wholly confined in the channel 103 intermediate the larger section 104 and the opening of the channel 103. The purpose of the chamfer 123a, shoulder 104a and the above-described configuration of the prongs 122a will be described below.

The head 120 of the anchor shaft 12 comprises a first jaw 124 having a first surface 124a and a second jaw 126 having a second surface 126a and a gap 120a formed therebetween for an insulated thermocouple 9 to pass through the gap. The first jaw has an end surface 124b and the second jaw has an end surface 126b which in use face towards the shelf surface to which a thermocouple 9 is to be anchored. The jaws 124, 126 merge proximal the neck 125. A duct 127 for receiving an insulated thermocouple 9 is formed in the head 120 and extends between the exterior of the head 120 and the gap 120a. A pair of bolt apertures 128 is formed transversely through the jaws 124, 126 for receiving bolts 129. The jaws 124, 126 are formed so as to be drawable together by tightening the bolts 129 so as to trap a thermocouple 9 passing through the gap 120a between the first and the second surfaces 124a, 126a respectively. The jaws 124, 126, on the other hand, are formed to be resiliently recoverable so as to spread apart once the tightening force of the bolts has been removed. It will be appreciated that such head 120 can be alternatively or additionally provided at the second end 102 of the housing 10 if desired.

In use, the spring 11 is loaded into the channel 103 and retained therein between the heads 123 of the anchor shaft 12 at the first end 11a and the bolt 15 at the second end 11b. It will be appreciated that in the absence of the bolt 15 the spring will be retained at its first end 11a by the end face 103a of the channel 103. Of course any other suitable retaining means may be provided to capture the spring 11 within the channel 103.

The spring 11 is chosen such that in a "ready-to-place" state of the holder 1, the spring 11 biases the housing 10 and the anchor shaft 12 apart and the bias can be overcome using suitable external means co-operating with the holder to shorten the holder to enable it to be located for use. Upon compression of the spring 11, the distance between the end surface 14a and the end surfaces 124b, 126b is less than the distance between the spaced apart shelf surfaces 80, 90. Such an arrangement enables quick and accurate positioning of the holder between the shelves 80, 90 without any part of the holder, and in particular the end surfaces 14a, 124b and 126b, catching on or sliding against the shelf surfaces. The spring 11 is retained in a compressed mode during the positioning between the shelves by gripping and holding the holder by the shoulders 107 and 121b to prevent the spring 11 from releasing before the holder reaches the desired position. Because the spring 11 remains compressed during positioning, no bias force is applied from the spring to the shelf surfaces during this action. It will be appreciated that the shoulders 107 and 121b may be configured in any suitable way for co-operation with the external means which apply the compression force to the spring to enable compression and retention of the spring in a compressed mode during positioning of the holder between the spaced apart shelf surfaces provided that neither the holder 1 nor the external means come into contact with the shelf surfaces during the positioning operation.

Figure 2B:
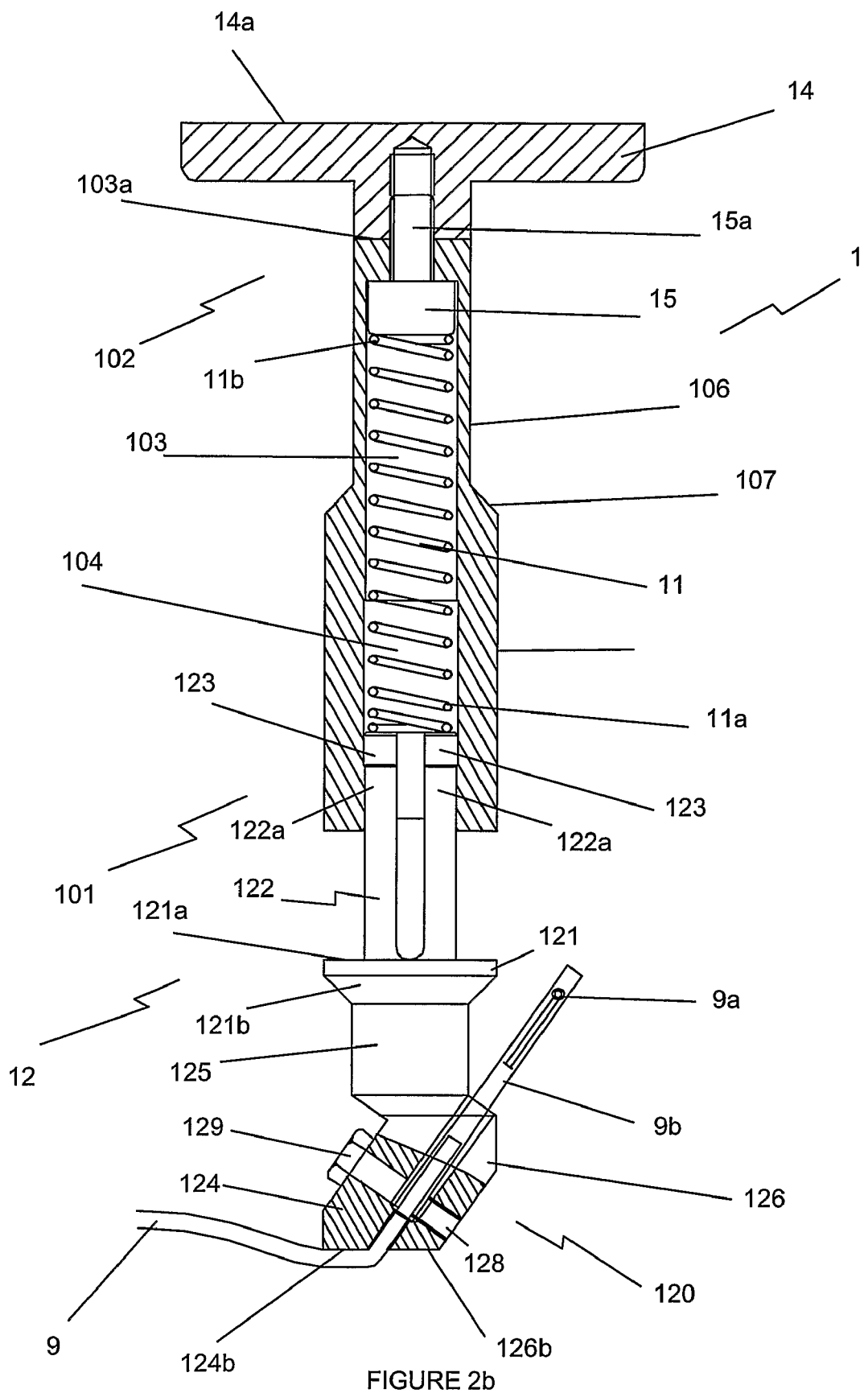
FIG. 2b is a cross-sectional elevation of the spring-loaded holder of FIG. 2.

The spring 11 is also chosen such that upon positioning of the holder 1 between the spaced-apart shelf surfaces 80 and 90, the spring 11 is released and the bias resumes to trap the holder between the spaced-apart shelf-surfaces 80 and 90 so that sufficient biasing force is provided from the spring 11 towards the anchor shaft 12 and towards the foot 14 to ensure that the holder 1 is held firmly and securely between the shelf surfaces 80 and 90 providing positive, biased contact of a weld bead 9a of a thermocouple 9 with one of the shelf surfaces 80, 90 (as shown in FIGS. 1 to 1c) and ensuring uniform thermal conductivity between the shelf surface 80 and the weld bead 9a. Alternatively and as shown in FIGS. 2 to 2b, positive contact between the exterior of a thermocouple 9 and one of the shelf surfaces 80, 90 is provided, ensuring that the weld bead 9a is suspended relative the shelf surface 80 or 90. As a further alternative shown in FIG. 2c, positive contact between the surface 14a and one of the shelf-surfaces 80 and 90 and between each of the surfaces 124b, 126b and the other of the shelf-surfaces 80 and 90 is provided ensuring that the weld bead 9a is suspended relative the shelf-surfaces 80 and 90. The distance between the shelf surfaces 80, 90 must fall within a pre-determined range of distances for a given configuration of the holder 1. Of course, the spring may be chosen so as to be able to clamp any type of conduit to the shelf surfaces 80, 90. It will be appreciated that any type of spring can be used in the holder 1. One such spring is a helical spring, such as the spring 11 shown in the drawings but many other forms of suitable biasing means will be known to the skilled person.

The above described way of positioning the bolt 15 in the housing provides the possibility of extending the length of the holder 1 in order to accommodate the holder between spaced-apart shelves, the distance between which is greater than a given selected maximum pre-determined distance. In such a case, the bolt 15 may have a longer shank (as shown for example in FIG. 5) onto which an extension tube 19 is threaded so that a free end 15a of the shank projects from an extension tube 19. The foot 15 is then screwed on to the free end of the stalk 15a. It will of course be appreciated that other possibilities exist for extending the length of the holder 1.

In use, the components of the spring-loaded holder 1 are pre-assembled. The foot 14 is secured to the second end 102 of the housing by the bolt 15. The spring 11 is then loaded into the channel 103. Next, the prongs 122a of the anchor shaft 12 are pressed together and loaded into the open end of the channel 103 with the heads 123 leading. The heads 123 advance in the channel 103 and enter the larger section 104. The heads 123 then spring apart by their own resilience to occupy the larger section 104. In practice, the spring 11 will be chosen such that when it is captured in the channel 103 between the bolt 15 and the heads 123 in a "ready-to-place" state of the holder 1, it will be compressed to provide biasing force towards the heads 123 so that the chamfers 123a of the heads 123 abut the shoulder 104a of the larger section 104 (FIG. 1c). This ensures that the holder 1 is extended to its maximum length prior to inserting the holder between the shelf surfaces 80, 90 of a lyophilizer. The ratio between the resilience of the prongs 122a is and the bias force acting from the spring 11 on the heads 123 when the chamfers 123a abut the shoulder 104a is such that said bias force of the spring 11 is overcome by the resilience of the prongs 122a. This prevents the conical surfaces of the chamfers 123a from riding over the conical surface of the shoulder 104a towards the opening of the channel 103 under the bias force of the spring 11 thus pressing the heads 123 together and permitting the heads 123 exit the larger section 104, which could result in the anchor shaft 12 disengaging from the housing 10. On the other hand, the resilience of the prongs 122a is selected such that when the chamfers 123a abut the shoulder 104a the resilient force of the prongs 122a can be overcome by gripping and pulling the portion of the anchor shaft 12 which projects outwardly from the opening of the channel 103 axially away from the housing 10. This causes the conical surfaces of the chamfers 123a to ride over the conical surface of the shoulder 104a towards the opening of the channel 103 under the action of the pulling force thus pressing the heads 123 together and permitting the heads 123 exit the larger section 104. The anchor shaft 12 can thus be disengaged from the housing 10. Because the prongs 122a are wholly confined in the channel 103 intermediate the larger section 104 and the opening of the channel 103, the heads 123 cannot be pressed together by applying converging pressure on the prongs 122a. This prevents any accidental or inadvertent disengagement of the anchor shaft 12 from the housing 10.

The maximum length of the holder 1 when in the extended, "ready-to-place" mode must be greater than the distance between the shelf surfaces 80, 90 to ensure that positive contact of a thermocouple 9 with the shelf surface 80 or 90 is provided upon placement of the holder 1 therebetween and the bias exerted by the spring 11 tends to bias the holder 1 into its extended mode.

Usually, the required numbers of thermocouples 9 are sealingly threaded into the isolation chamber of a lyophilizer or other chamber via a bulkhead opening fitted in a wall of the lyophilizer. The thermocouples are provided with a sufficient cable slack so that the ends of the thermocouples containing weld beads can extend to all desired locations within the lyophilizer. Usually one holder 1 is used for one thermocouple, but of course the holder 1, or the head 120 of the holder, can be modified to receive more than one thermocouple or any other conduit.

A thermocouple end is then fed into the gap 120a between the jaws 124, 126 of the head 120 of the anchor shaft 12 and fastened in the gap by the bolts 129.

For recording shelf surface temperature in a lyophilizer during validation (FIGS. 1 to 1c), the weld bead 9a enters the gap 120a via the duct 127 and exits the gap about the surfaces 124b, 126b, so that the sensor end 9b of the thermocouple 9 projects outwardly from the gap 120a. The end 9b is then bent to extend across one of the surfaces 124b or 126b.

For recording air temperature above a shelf surface in a lyophilizer during validation using the embodiments of holders shown in FIGS. 2 to 2b, the weld bead 9a enters the gap 120a about the surfaces 124b, 126b and exits the gap via the duct 127, so that the end 9b projects outwardly from the duct 127. The thermocouple is then bent so that it extends across and is in contact with one of the first surface 124a or the second surface 126a.

In both above mentioned cases bolts 129 are tightened to draw the jaws 124, 126 together, so that compressive force is applied to the thermocouple 9 from the first surface 124a and the second surface 126a to secure the thermocouple 9 in the gap 120a.

The shaft 12 may be modified for receiving a thermocouple for air measurements without the thermocouple 9 having to pass across of the first surface 124a or the second surface 126a and, in use, being compressed between said first of second surface and one of the shelf surfaces 80, 90. As shown in FIG. 2c, a through-bore 125a is formed transversely in the neck 125 of the shaft 12. A thermocouple 9 is received in the bore so that the end 9b of the thermocouple 9 projects outwardly from an opening of the through-bore 125a. A suitable means for securing the thermocouple in the through-bore 125a (not shown) may be provided.

The above-described state of the holder 1 when assembled is the "ready-to-place" state. In this state the holder 1 can be compressed by pushing the anchor shaft 12 and the housing 10 axially towards each other so as to compress the spring 11 in the channel 103 and to reduce the length of the holder 1, thus enabling the holder to be manoeuvred between the shelf surfaces 80, 90 into the desired location. Upon positioning in the desired location, the spring 11 is released and the holder 1 extends between the shelf surfaces 80, 90 so that the holder 1 is held securely between them. A weld bead 9a of a thermocouple 9 is thereby biased into contact with the shelf surface 80 (or 90 where the holder is inserted). This ensures uniform thermal conductivity between the shelf surface 80 or 90 and the weld bead 9a for accurate and reproducible shelf temperature measurement. Alternatively, the thermocouple 9 which passes across one of the first surface 124a or the second surface 126a is compressed between said surface and the shelf surface 80 or 90 to ensure that the weld bead 9a is suspended above the shelf surface 80 or 90 to measure air temperature. In the case where the thermocouple 9 is received in a bore 125a for air measurements, the first surface 124a and the second surface 126a press against the shelf surface 80 or 90.

If the desired location for the holder 1 is accessible from the door opening of a lyophilizer, then an operator can manually compress the spring 11 by pushing the housing 10 and the anchor shaft 12 axially together. He can then position the holder 1 between the shelf surfaces 80, 90 in the desired location and release the spring 11 to extend the holder 1 between the shelf surfaces 80, 90. Conversely, in order to remove the holder 1 the operator can manually compress the spring 11 by pushing together the housing 10 and the anchor shaft 12, then removing the holder 1 from the lyophilizer and releasing the spring 11 to bring the holder 1 back into a "ready-to-place" state.

The housing 10 and the anchor shaft can be pushed together to compress the spring 11 until the mating surface 121a of the collar 121 abuts the housing.

However, for the purposes of maintaining sterility of the holder 1 and the components of a lyophilizer and/or for easy gripping and placement of the holder 1 in less accessible desired locations, a placement tool 2 is provided by the present invention. The placement tool is firstly operable to engage the holder 1 at the necks 106, 125 of the housing 10 and anchor shaft 12 respectively and to apply axial pressure on the housing 10 and the anchor shaft 12 to pull them axially towards each other so as to compress the spring 11 and reduce the length of the holder 1. The placement tool is secondly operable to transfer the holder 1 to a desired location in between spaced-apart shelf surfaces 80 and 90. The placement tool is finally removable so as to release the pressure acting to hold the housing 10 and the anchor shaft 12 towards each other against the bias of the spring 11, thus extending the holder 1 between the shelf surfaces 80, 90. The placement tool 2 is operable in a similar but reverse manner in order to remove the holder 1 from its extended position between the shelf surfaces 80, 90.

Referring to FIGS. 6 to 14 the placement tool 2 will now be described. In the description of the placement tool 2 the terms "distal", "distally", "proximal" and "proximally" are used relative to an operator using the tool in the manner described.

The placement tool 2 has a proximal end 201 and a distal end 200 and a housing tube 40 extending between the ends. An L-shaped support block 30 is provided at the distal end 200, and a pair of gripping jaws 20 is movably mounted on the support block 30. A connecting rod 39 is movably mounted within the housing tube 40 and extends between the proximal end 201 and the distal end 200 of the placement tool 2.

An operating mechanism 50 for operating the connecting rod 39 is provided at the proximal end 201 of the placement tool 2. The connecting rod 39 is connected to the gripping jaws 20 via a series of kinematic pairs which transform axial movement of the connecting rod so as to close or open the gripping jaws 20. Elements of the placement tool and their co-operation will now be described in detail.

The support block 30 has a support plate 31 which in use is parallel to the spaced-apart shelf surfaces 80, 90 and a foot 32 which in use is perpendicular to the spaced-apart shelf surfaces 80, 90. The support plate 31 has a first half-bore 31d (FIG. 10b) and the foot 32 has a second half-bore 32a (FIG. 11) so that when the support plate 31 and the foot 32 are coupled together by a pair of bolts 37, a bore (not indicated by a reference numeral) is formed by said first and second half-bores 31d, 32a for clamping therein a distal end 40a of a housing tube 40 (FIGS. 6b, 6c). The support plate 31 has a top face 31a, a bottom face 31b and a pair of side faces 31c. A pair of dowel pins 33 extends transversely through bores 31e (FIG. 10) of the support plate 31 and projects proud of said top and bottom faces. The pair of gripping jaws 20 is slidably mounted on the pins 33 by means of respective bores 21 of said jaws. One of the jaws 20 is mounted on the pins 33 at the top face 31a of the support plate 31, and the other of the jaws 20 is mounted on the pins 33 at the bottom face 31b of the support plate 31.

A recess 34 is formed in the support plate 31 in the bottom face 31b thereof. A slot 34a is formed along each side face 31c so that the slots 34a open into the recess 34. A traveller 35 is positioned across the recess 34 and is movable in the slots 34a between a distal position and a proximal position. The traveller 35 has a pair of end faces 35a (FIG. 12) which face outwardly when the traveller is positioned in the slots 34a.

Each jaw 20 comprises a gripper 23 sized and shaped to engage with one of the necks 106 and 125 of the housing 10 and anchor shaft 12 respectively. Each jaw 20 further comprises a pair of side faces 20a and a pin 22 which extends transversely through a bore 20d (FIG. 8) of the jaw 20 between the side faces 20a so that ends of the pin 22 project proud of the side faces 20a and form cam followers 22a.

A cam plate 25 is attached to each end face 35a of the traveller 35 by bolts 36 so that the cam plates 25 are parallel to the side faces 20a of the jaws.

A pair of slots 26 is formed in each cam plate 25. Each slot 26 is adapted for receiving a cam follower 22a of one of the jaws 20 so that said cam follower can travel along the slot 26. The cam slots 26 are spaced apart from each other on the plate 25 and taper towards each other so that the distance between ends 26a of the slots is greater than the distance between ends 26b of the slots.

The traveller 35, the cam plates 25 and the gripping jaws are mutually disposed so that when the traveller 35 is in the distal position in the slots 34a, the cam followers 20a are positioned at the ends 26a of the slots 26 and the gripping jaws 20 are most spread-apart from each other on the dowel pins 33. Conversely, when the traveller 35 is in the proximal position in the slots 34a, the cam followers 20a are positioned at the ends 26b of the slots 26 and the gripping jaws 20 are most close-together on the dowel pins 33. The cam plates 25 are movable with the traveller 35 enabling translation of the gripping jaws 20 from the most spread-apart position to the most close-together position and vice versa. The state of the placement tool 2 when the gripping jaws 20 are in the most spread-apart position is an "open" state. The state of the placement tool 2 when the gripping jaws 20 are in the most close-together position is a "closed" state.

A connector 42 is coupled with the traveller 35 by a bolt 41. The connecting rod 39 is fixedly coupled with the connector 42 at a distal end 39a of the rod. In use, the connecting rod 39 is contained within the housing tube 40 so that a proximal end 39b of the connecting rod projects outwardly from the housing tube 40 at a proximal end 40b of the housing tube. A follower 39c is formed on the tip of the proximal end 39b of the connecting rod 39. The function of follower 39c will be described below. The connecting rod 39 is operable to move the traveller 35 in the slots 34a between the distal and the proximal positions.

It will be appreciated that any type of linkage can be employed in the placement tool 2 in order to transmit the movement of the connecting rod 39 to the gripping jaws 20 so as to draw the gripping jaws 20 close-together or to spread them apart.

The operating mechanism 50 comprises a fork 51 having a stem 51a fitted in the opening of the proximal end 40b, a through-bore 51b extending along the stem 51a and a pair of spaced-apart prongs 51c projecting axially from the stem 51a. The bore 51b is adapted to slidably receive the proximal end 39b of the connecting rod 39 so that follower 39c of the connecting rod 39 projects from the through-bore 51b and is positioned between the prongs 51c.

The operating mechanism 50 further comprises an axle 52 extending across the gap between the prongs 51a. A disc 53 is mounted eccentrically on the axle 52 and is pivotable about the axle 52. A handle 54 projects radially from the cylindrical exterior of the disc 53.

The disc 53 has an internal path 53a formed concentrically with the geometrical central axis of the disc. The path 53a is sized so that the follower 39c of the connecting rod 39 can be positioned therein and slidably travel along the path when the disc 53 pivots about the axle 52. A slit 53b is formed between the cylindrical exterior of the disc 53 and the path 53a, the slit being sized to allow the connecting rod 39 to pass across the slit between the exterior of the disc 53 and the follower 39c when the follower 39c is positioned in the path 53a. The path 53a has a first end 53c which is most proximal to the axle 52 and a second end 53d which is most distal from the axle 52.

In the open state of the placement tool 2 the follower 39c is in a distal position relative the axle 52 and occupies the second end 53d of the path 53a. A transition between the open and the closed states of the placement tool 2 is effected by turning the handle 54 by 180 degrees in the direction of arrow I (FIG. 6a). During the relative motion of the follower 39c in the path 53 the follower 39c is drawn proximally towards the axle as the first end 53c approaches the ball. The connecting shaft 39 pulls the traveller 35 and the cam plates 25 proximally and initiates relative motion of the cam followers 22a in the slots 26 from the first ends 26a of the slots 26 towards the second ends 26b thus causing the gripping jaws 20 to travel along the dowel pins 33 towards each other. The relative motion of the cam followers 22a in the slots 26 will continue until the handle 54 completes the 180 degree turn, the cam followers 22a occupy the second ends 26b of the slots 26 and the gripping jaws 20 acquire the close-together position. In the closed state of the placement tool 2 the follower 39c is in a proximal position relative the axle 52 and occupies the first end 53c of the path 53. A reverse operation of transition of the placement tool 2 back into the open state is effected by turning the handle 54 by 180 degrees in the direction of arrow II (FIG. 7a). It will be understood that any known mechanism can be provided for operating the connecting rod 39 of the placement tool 2.

A support 60 is provided at a location along the housing tube 40. The foot 32 of the support block 30 and the support 60 provide two base points to assist the placement tool 2 to acquire parallel orientation relative the shelf-surfaces 80, 90 during placement of the holder 1.

Gripping and placement of a "ready-to-place" holder 1 between the spaced-apart shelf surfaces 80, 90 will now be described. First an operator engages the grippers 23 of the jaws 20 with the necks 106 and 125 of the housing 10 and the anchor shaft 12 respectively. Then the placement tool 2 is closed by turning the handle 54 by 180 degrees in the direction of arrow I (FIG. 6a) and the gripping jaws 20 are drawn towards each other. The grippers 23 exert axial pressure on the shoulders 107 and 121b of the housing 10 and of the collar 121 respectively to push together the housing 10 and the anchor shaft 12 axially against the spring bias. The spring 11 thus compresses in the channel 103 of the housing 10 between the bolt 15 and the heads 123 reducing the length of the holder 1. Next, the operator manoeuvres the distal end 200 of the placement tool 2 with the holder 1 between the spaced-apart shelf surfaces 80, 90 into the desired location. Once the desired location has been reached the operator aligns the placement tool 2 parallel to the shelf surfaces 80, 90 by bringing the foot 32 and the support 60 in contact with one of the shelf surfaces, for example, the shelf surface 80, so that the holder 1 has perpendicular orientation with respect to the shelf surfaces 80, 90 (FIG. 7). The operator then opens the placement tool 2 by turning the handle 54 back by 180 degrees in the direction of arrow II (FIG. 7a) and the gripping jaws 20 spread apart, so as to release the axial pressure acting on the housing 10 and the anchor shaft 12 from the grippers 23. The spring 11 releases and pushes the housing 10 and the anchor shaft 12 away from each other thus extending the length of the holder 1. As shown in FIG. 6, the end surface 14 of the foot 14 presses against the shelf surface 90 and the weld bead 9a of the thermocouple 9 is pressed against the shelf surface 80 by the surface 124*b* of the jaw 124 of the head 12. Alternatively, although not shown in the drawings, in the case where the thermocouple passes across one of the surfaces 124*b* or 126*b*, for example the surface 124*b*, and the weld bead 9*a* projects outwardly from the duct 127, the end surface 14 of the foot 14 presses against the shelf surface 90 and the thermocouple 9 is pressed against the shelf surface 80 by the surface 124*b* of the jaw 124 of the head 120. The placement tool 2 is then withdrawn proximally and the holder 1 is now in a "ready-to-use" state.

The reverse operation of removing the holder 1 extended between the shelf surfaces 80, 90 is conducted in a similar manner as described above. The distal end 200 of the placement tool 2 is manoeuvred towards the holder 1. The grippers 23 of the jaws 20 then grip and compress the holder 1. The placement tool 2 with the holder 1 is withdrawn proximally from the space between the shelf surfaces 80, 90. The spring 11 is released and the holder 1 extends to a maximum length returning into a "ready-to-place" state.

Referring now to FIGS. 16 to 30*a*, an alternative head arrangement for securing the thermocouple to the holder 1 is shown. The holder 1 is as described above in all respects save that a head 220 of the anchor shaft 12 is adapted to provide a improved means of capturing the thermocouple 9 so as to provide better conductive contact between the weld bead at the sensor end 9*b* of the thermocouple 9 and the shelf. The head 220 is formed with an enlarged receiver 221 which is open at its base 221*a* to receive a conductive body having a contact surface for abutting the shelf. The conductive body is shown here in the form of a disc 230 (see FIGS. 19, 27 to 28) having a contact surface 233. The receiver 221 comprises a planar flange portion 222 from which depends an endless skirt 223. The conductive disc 230 is securable in the area 223*a* defined within the skirt 223. The disc is so sized and/or so secured in the area 223*a* as to project proud of the skirt 223, beyond the base 221*a* of the receiver 221, to ensure that the disc 230 makes good contact with a shelf in use, or at least the contact surface 233 is flush with the base 221*a*. The skirt 223 has a channel 224 leading between exterior and interior surfaces of the skirt 223 through which a thermocouple 9 can be led.

As shown in FIGS. 16 and 17, securing screws 225 may be provided for clamping the thermocouple 9 in place when it is received in the channel 224. A slot 224*a* is formed radially in the receiver 221 extending from the periphery into the body of the receiver 221 in the same direction as the channel 224 and intersecting the channel 224 in a lateral direction. The slot 224*a* is defined by upper and lower flaps 224*c* and 224*d* respectively, of the receiver 221, and bores (not shown) for receiving the screws 225 are formed extending through the two flaps 224*c* and 224*d*. When the thermocouple 9 is received in the channel 224, the screws 225 are tightened in the bores so as to draw the flaps 224*c* and 224*d* together, thus clamping the thermocouple 9 therebetween.

In the present embodiment, the conductive disc 230 comprises a solid block of conductive material with a blind-ended channel 231 formed therein for receiving the exposed thermocouple weld bead in conductive contact with the disc 230. As can be seen more clearly in FIGS. 27 and 28, the disc 230 comprises a body having two flat circular surfaces 232, 233 spaced apart from one another. A channel 231 is bored radially in the body of the disc 230. The channel 231 comprises two sections, a wider bore section 231*a* leading from the exterior of the body of the disc 230 and a narrower bore section 231*b* having an ending in the interior of the body of the disc 230. When the weld bead of the thermocouple 9 is moved through the channel section 231*a* to the end of the channel section 231*b*, it contacts the surrounding material of the conductive disc 230, which in turn is in direct contact with the surface of an underlying shelf. Such an arrangement has been found to give superior performance of the thermocouple, with notable reduction or avoidance of temperature lag being detected. Furthermore, temperature readings taken by thermocouples pressed down by a holder with a conductive disc as described above proved to be significantly more accurate than the readings taken by thermocouples pressed down by the conventional method using a sticky tape.

The channel bore section 231*b* is shaped and sized to match the shape of a sensor end of a typical commercially available thermocouple and to enable the thermocouple end to be readily received and placed in the channel 231. In some cases, however, the external dimensions of insulated sensor ends of commercially available thermocouples may not match the dimensions of the channel 231 so as to provide good contact between the surrounding disc material and the insulation material at all points in the channel 231. For this reason, thermocouples without any insulation on the sensor ends may be selected, and insulation sheaths specifically dimensioned to match the two-section configuration of the channel 231 may be provided for covering the thermocouple sensor ends. An additional bore 234 is formed in the disc 230 transversely in relation to the channel 231 and extending between exterior of the disc 230 and interior of the channel 231. The additional bore 234 receives a screw for securing a thermocouple 9 within the channel section 231*a*. It will be appreciated that the channel 231 can have any suitable configuration provided it is shaped to accommodate a sheath covering the sensor end of a thermocouple to provide sufficient abutment between the surfaces defining the channel 231 and the sheath to enable substantially lossless energy transfer from the disc to the thermocouple.

Placing the weld bead of a thermocouple in a conductive environment in which the conductive contact is not reliant on forming a point contact, but instead provides surface or circumferential contact about the longitudinal axis of the sensor end of the thermocouple provides improved heat transfer to the weld bead and more consistent results, even without the use of conductive paste or grease. Of course, conductive grease may be placed on the thermocouple bead or in the channel section 231*b* if desired.

The material of the disc 230 is selected to provide low resistance with good heat transfer. The disc 230 should readily accept and discharge heat in order to allow the thermocouple accurately and quickly to measure the temperature of the shelf with which it is in contact. Of course, any suitably sized conductive solid body having a shape other than disc shape can be equally effectively employed instead of the disc 230, so long as the body is provided with a flat contact surface for abutting a shelf surface and with a duct for leading a sensor end of a thermocouple into the interior of the body. However, a traditional disc shape having two planar circular surfaces separated by a distance sufficient to enable the blind-ended channel 231 to be formed embedded in the material of the disc between the planar circular surfaces with sufficient amount of disc material surrounding the channel along all its length, so as to provide good conductivity at all points on the disc to a thermocouple captured within the channel 231 has been found to be particularly beneficial. Suitable materials for the disc include conductive metals, for example aluminium, alloys and ceramics.

Energy transfer performance of the disc depends on its material and configuration. In order to enable effective and accurate measurements of surface temperature, especially in the condition when the surface temperature descends or ascends at a certain rate, the material and the size of the disc should be such that energy transfer from the shelf surface to the disc and from the disc to the thermocouple occurs at the same rate as or faster than the temperature gradient of the shelf. For example, it has been found that in a lyophilizer, at the temperature gradient of 1° C. per minute, an aluminium disc having a diameter of 2.54 mm (1 inch) and a thickness of 3.8 mm (0.148 inch) yields a zero lag energy transfer.

The disc 230 can be secured in the receiver 221 by any suitable means, such as, for example (as shown in FIGS. 19 and 20), screws 226 circumferentially spaced apart around the disc and extending through the depending skirt 223 radially inwardly to hold the disc 230 in place. Other securing means such as pins, springs and the like can alternatively be used.

Further alternatively, an insulation pad (to be described below) can be provided so that heat conduction is performed through the disc 230 primarily at only the desired surface or location and that influences from surrounding, extraneous events are minimised. The insulation pad may supply the auxiliary purpose of locating and holding the disc 230 in place in the receiver 221. For the insulation purpose, it is desirable to provide insulation about the thermocouple in all directions other than the one to be measured. For this reason, an insulating pad, such as pad 227 shown in FIGS. 16 and 17 may be provided. The pad 227 is sized and shaped to occupy the interior space 223a of the receiver 221 and to project slightly proud therefrom, beyond the base surface 221a of the receiver 221. In its lower facing surface as shown in the drawings, the pad 227 is formed with a disc-shaped recess to retainably receive the disc 230 and a channel for housing the thermocouple 9. In use, the disc 230 seats in the recess of the pad 227 with at least a portion of the disc 230 either flush with or extending outside the pad 227 so that the disc can make a good contact with a shelf with which the holder 1 is engaged. The pad 227 may be made of any suitable insulating material including open and closed celled foam. A foam material which does not collapse about the disc is preferred, since this is better able to retain the desired insulation about those parts of the disc not in conductive contact with the shelf in use. FIGS. 18 to 20 show a variant embodiment in which the insulator is formed as an annular pad 228 sized to fit between the upwardly facing circular surface 232 of the disc 230, the inner skirt wall and the end interior surface of the receiver 221. The variant of FIG. 20 varies from that of FIG. 19 in that the disc size is smaller.

In the arrangements shown in FIGS. 21 to 30, insulation about the disc 230 is effected by provision of a space or spaces about the sides of the disc, other than the side of the disc which in use is in intimate contact with the shelf. Space 229 defined between the external surfaces of the disc 230 and the interior surfaces of the receiver 221 is intended to be in communication with the surrounding atmosphere in order to contain non-conductive air or other gas or gaseous mixture, or to have a vacuum applied to the space 229. The disc 230 is retained in the receiver 221 by means of spring wires 226a, one end of each of which seats in a receiving bore 235 formed in the disc 230. FIGS. 27 and 28 show four such bores 235 equidistantly spaced about the periphery of the body of the disc 230. The other end of each spring wire 226a extends through or is embedded in the wall of the skirt 223. These four steel spring wires are arranged to hold the disc 230 in position in the receiver 221, so that the disc projects outwardly from the internal area 223a of the receiver 221 into the position proud of the base surface 221a of the receiver 221 (FIG. 24). In use, when the base surface 221a of the receiver 221 is biased by the spring 11 of the holder 1 into contact with the shelf, the spring wires 226a deform in order to allow the outwardly facing surface 233 of the disc 230 align with the base surface 221a. The bias force exerted from the deformed spring wires 226a on the disc 230 is sufficient to bias the outwardly facing surface 233 of the disc 230 into good contact with the shelf. For this reason also, the bias force of the spring 11 is sufficient to deform the spring wires 226a when the receiver 221 is clamped to the shelf by the bias force of the spring 11.

In the variant of FIGS. 21 to 23a, auxiliary insulation, in addition to the insulation provided by the presence of non-conductive air or by absence of matter in the space 229, is provided by means of an annular insulating pad 228a disposed in an annular groove 223b formed in the base 221a of the receiver 221. The annular pad 228a may project outwardly from the receiver 221 beyond the base 221a thereof when the holder 1 is not in use and collapse flush with the base 221a when the receiver is clamped to the shelf.

The most preferred arrangement of the receiver 221 is shown in FIGS. 24 and 24a which are similar to FIGS. 23 and 23a, but without provision of a groove or an insulating pad in the receiver 221. It has been found that mere provision of non-conductive air or absence of matter in the space 229 without auxiliary insulation is not only sufficient for good conduction of heat from shelf surface to the thermocouple, but provides the best and most reliable performance of the thermocouple 9.

In the variant shown in FIGS. 25 and 25a, the receiver 221 is provided with a stopper member in a form of an annular ridge 250 projecting a certain distance proud from a base wall 223c of the internal area 223a in the receiver 221. The purpose of the annular ridge 250 is to prevent the spring wires 226a from over-deforming in use when the base surface 221a of the receiver 221 is biased into contact with the shelf. During transfer into this position, the disc 230 is pushed towards the base wall 223c to a pre-determined distance, usually such that the contact surface 233 of the disc is flush with the base surface 221a of the receiver 221 whilst the spring wires 226a experience a certain degree of deformation (see FIG. 25). The spring wires 226a are sufficiently resilient to re-gain their original configuration once the bias force from the spring 11 has been withdrawn (see FIG. 26). As shown in FIG. 25, during normal or test use, the upwardly facing surface 232 of the disc is spaced from the ridge 250 by a distance S and, as described above, the disc is not in contact with any of the interior surfaces of the receiver 221 when the contact surface 233 of the disc is flush with the base surface 221a of the receiver. As described above, this spacing prevents energy exchange between the disc 230 and the receiver 221. In the absence of a stopper-member, if the disc 230 is accidentally pushed towards the base wall 223c beyond the predetermined distance, the spring wires 226a might over-deform and not re-gain their original configuration once the bias force from the spring 11 has ceased. Such over-deformation may result in the disc 230 not returning to its position projecting proud of the base surface 221a of the receiver 221. Over-deformation may also affect subsequent conductive performance of the disc 230 because the disc 230 will not be sufficiently biased by the spring wires 226a into abutment with the shelf. The annular ridge 250 prevents such over-deformation of the spring wires 226a by impinging on the upwardly facing surface 232 of the disc 230 and stopping the disc 230 from moving any further if an attempt is made to push the disc 230 further towards the base wall 223c of the receiver 221. It will be appreciated that instead of the annular ridge 250, one or more stopper member(s) may be provided in the internal area 223a of the receiver 221 of any suitable configuration capable of preventing the disc 230 from moving towards the base wall 223c beyond a pre-determined distance. Radially extending bores 251 may be formed in the wall of the skirt 223 for receiving a free end 226b of a spring wire 226a extending from the disc 230. Each bore 251 is formed to receive a screw 252 through its outwardly facing open end for preventing the spring wire 226a from axial displacement along the bore 251. Nevertheless, as can bee seen in FIGS. 25 and 25a, a certain degree of axial play (see arrow P) is allowed for the spring wires 226a together with the disc 230 in the bores 251 to avert axial compression of the spring wires 226a between the disc 230 and the screws 252. FIG. 26 shows a spring-loaded holder 100 in accordance with the invention positioned between a pair of shelf surfaces 80 and 90. The holder 100 has a head 220 with a ridge 250 as described above. Instead of a foot 14, a butt surface 130 is provided at the second end 102 of the holder for better manoeuvrability.

FIGS. 30 to 34 show a variant embodiment of the holder 1 in which the tubular housing 10 and the anchor shaft 12 are secured using a stop mechanism 420 rather than using prongs 122a and expanded heads 123 as shown in FIGS. 1 to 5, the stop mechanism 420 being the preferred arrangement. The stop mechanism 420 comprises a pin 423 (see FIG. 30) which extends across the channel 103 of the housing 10 in the region of the first end 101 of the housing 10. A through slot 421 (FIGS. 31 and 32) is formed axially in the body member 122 of the anchor shaft 12. In use, when the body member 122 is positioned in the channel 103, the slot 421 is in engagement with the pin 423, and the body member 122, guided by the pin 423, can travel along the channel 103 between first and second end positions. At the end positions of the body member 122, the pin 423 abuts end surfaces 421a, 421b of the slot 421 and thus prevents the anchor shaft 12 from either travelling too far into the channel 103 or disengaging from the housing 10. The pin 421 rests in a transverse bore 422 formed in the walls of the housing 10 in the region of the first end 101 of the housing (see FIGS. 33 and 34). Both the through slot 421 and the transverse bore 422 are suitably sized to receive the pin 423 (see FIG. 30).

On assembly, the body member 122 is inserted into the channel 103 of the housing 10 and the through slot 421 is placed in register with the transverse bore 422. The pin 423 is then threaded through the bore 422 and though the slot 421. It will be appreciated that the slot 421 may not necessarily be a through slot and the pin 421 does not have to fully cross the channel 103. Indeed, an arrangement is possible where there are provided guide slots along the body member 122 and follower members projecting proud from the channel 103 walls, the follower members being engageable with the slots so as to guide the anchor shaft 12 in its motion in the channel 103 and to retain the anchor shaft 12 in engagement with the housing 10.

As shown in FIGS. 21 and 30 a cap 430 may be provided at the second end 102 of the housing 10 instead of the foot 14, which aids manoeuvrability of the holder 1 between shelves. The cap 430 may be replaced by a cap 431 (see FIG. 30a) having a longer stalk 432 for extending the holder 1.

Although the spring-loaded holder described above including the housing, the passage formed therein and the anchor shaft are circular in cross-section, they can be of any suitable shape as long as it does not affect the functionality of the holder 1. While the holder has been described as being clamped between two shelves, it may of course be clamped between any two spaced-apart surfaces, whether of shelving or otherwise.

Further, a list of reference numbers is provided, as follows:
2300 means for retaining a conduit;
110 biasing means;
1070, 1210 means for retaining the biasing means in a compressed mode;
1220 means for retaining the shaft in engagement with the housing;
2260 means for biasing the block into contact with a surface of the external device;
2270 a thermal insulation means;
2210 means for retaining the block at the second end of the housing or the second end of the shaft;
2266 fastening means;
2300 gripping means;
540 handle means; and
390 linkage means.

It is thought that the present invention and its advantages will be understood from the foregoing description and it will be apparent that various changes may be made thereto without departing from the scope of the invention, the forms hereinbefore described being merely preferred or exemplary embodiments thereof.

The invention claimed is:

1. A holder for receiving a conduit comprising:
a first member having a first bearing surface;
a second member having a second bearing surface;
at least one of the first or second members including means for retaining a conduit; and
a housing having first and second ends extending between the first and second members for accommodating a biasing means which is operable to bias the first and second members apart so that in use, the first and second surfaces are biased into engagement with a pair of surfaces of an external device so as to retain the holder between the pair of surfaces,
the biasing means being compressible to reduce the distance between the first and the second bearing surfaces so that the distance therebetween is less than the distance between the pair of surfaces,
wherein the holder comprises means for retaining the biasing means in a compressed mode during an operation of positioning of the holder between the pair of surfaces so that no bias force from the biasing means is applied to the pair of surfaces during the operation of positioning and
wherein the means for retaining the conduit comprise a block provided at the second end of the housing, the block having at least one contact surface for contact with a surface of said external device, the block being made from a heat conductive material; and a first channel extending from an exterior into an interior of the block, the first channel being suitably shaped for receiving the conduit and the first channel being formed with sufficient amount of the material of the block surrounding the first channel along its length so as a heat conduction evenly from the block to the conduit disposed in the first channel.

2. A holder as claimed in claim 1, wherein the housing defines the first member and a second channel extending between the first and second ends, said second channel being open at the first end of the housing and closed proximal the second end of the housing, the second channel being defined by a side wail and a first end-face proximal the second end of the housing, the housing further comprising a second end-face on an exterior of the second end of the housing;
the second member comprises a shaft having first and second ends, the second end having a third end-face and said shaft being slidably receivable in the second channel in use;

the first bearing surface being defined by the second end-face of the housing;
the second bearing surface being defined by the third end-face of the shaft; and
the holder further comprises means for retaining the shaft in engagement with the housing.

3. A holder as claimed in claim 2, wherein the biasing means is disposed and retained in the second channel between the first end-face of the second channel and the first end of the shaft and is operable to apply bias force to said first end-face of the second channel and the first end of the shaft so as to spread the housing and the shaft apart so that of the first and second bearing surfaces engage with said pair of surfaces of said external device so as to retain the holder between the pair of surfaces.

4. A holder as claimed in claim 2, wherein the means for retaining the shaft in engagement with the housing comprises a plurality of prongs projecting axially about the first end of the shaft, each prong having an expanded head formed at the free end of the prong and each head having a top face, and a widened section of the second channel formed intermediate the first and the second ends of the housing defining a chamber for receiving the expanded heads, the free ends of the prongs being flexibly movable relative each other to allow the expanded heads to be pressed together so as to enable the expanded heads to enter the second channel through the opening of the first end of the housing and to advance towards the chamber; and
the material of the prongs being sufficiently resilient so as to allow the prongs to spread apart upon release, when the expanded heads have entered the chamber, so that the heads are retained in the chamber.

5. A holder as claimed in claim 2, wherein the means for retaining the shaft in engagement with the housing comprises at least one follower member extending transversely in the second channel in the region of the first end of the housing; and
at least one guide slot formed axially in the body of the shaft about the region of the first end of the shaft, the guide slot being sized for engaging with the follower member when the region of the shaft containing the guide slot is disposed in the second channel; wherein the engagement of the at least one follower member and the at least one guide slot permits axial travel of the shaft in the second channel of the housing between first and second end positions;
and the follower member is operable to engage regions of the shaft defining the guide slot when the shaft reaches the first and second end positions thus preventing the shaft from traveling beyond said positions and retaining the shaft in engagement with the housing.

6. A holder as claimed in claim 2, wherein the first and second members are adapted to engage with respective gripping means of a placement tool.

7. A holder as claimed in claim 1, wherein the block is provided with means for biasing the contact surface of the block into contact with a surface of said external device.

8. A holder as claimed in claim 7, wherein the holder is provided with means for retaining the block at the second end of the housing or the second end of the shaft.

9. A holder as claimed in claim 8, wherein the means for retaining the block at the second end of the housing or the second end of the shaft comprise:
a receiver portion comprising a base surface, the base surface comprising the first or the second bearing surface;
a recess formed in the base surface of the receiver portion for disposing the block therein;
a passage for receiving the conduit, the passage extending between the exterior of the receiver and the recess; and
fastening means for holding the block in the recess.

10. A holder as claimed in claim 9, wherein the fastening means comprise a plurality of springs extending between the block and inner surfaces of the receiver which define the recess, the springs being arranged so that a portion of the block which contains the contact surface projects proud in relation to the base surface of the receiver when the bias means of the holder is in a released mode.

11. A holder as claimed in claim 9, wherein the fastening means comprise a plurality of rigid fastening members extending between inner surfaces of the receiver which define the recess and the block, the fastening members and the block being mutually arranged so that a portion of the block which contains the contact surface is flush with the base surface of the recess when the holder is in a released mode.

12. A holder as claimed in claim 9, wherein the biasing means of the block is operable to deform upon engagement of the base surface of the receiver with said surface of said external device so as to bring the contact surface of the block from a position proud in relation to the base surface of the receiver to a position at least flush with the base surface.

13. A holder as claimed in claim 12, wherein at least one stopper member is disposed in the recess of the receiver, the stopper member being spaced from the exterior of the block when the block is in the position in which the biasing means of the block is deformed and the contact surface of the block is at least flush with the base surface of the receiver, the stopper member being configured to abut on the block and stop it at a pre-determined distance from the base surface of the receiver.

14. A holder as claimed in claim 13, wherein inner surfaces defining the recess include a base wall remote from the opening of the recess and wherein the stopper member comprises a protrusion projecting from the base wall towards the opening of the recess.

15. A holder as claimed in claim 14, wherein the protrusion is in a form of a substantially endless ridge.

16. A holder as claimed in claim 12, wherein the biasing means comprises a plurality of springs extending between the block and the inner surfaces of the receiver which define the recess, the springs being arranged so that the portion of the block which contains the contact surface projects proud in relation to the base surface of the receiver when the bias means of the holder is in a released mode.

17. A holder as claimed in claim 9, wherein the thermal insulation means is provided either by a non-conductive gas or gaseous mixture or a vacuum in a gap between the exterior of the block and inner surface or the receiver which defines the recess.

18. A holder as claimed in claim 1, wherein a thermal insulation means is provided substantially around all parts of the block except for the contact surface of the block so as to prevent thermal exchange between those parts of the block and a surrounding atmosphere.

19. A holder as claimed in claim 1, wherein the block is in a form of a disc having a first and second substantially planar parallel surfaces and a circumferential surface substantially perpendicular to the first and the second surfaces and wherein the contact surface is one of the two substantially planar surfaces.

20. A holder as claimed in claim 1, wherein the means for retaining the biasing means of the holder in a compressed mode during the operation of positioning of the holder between the pair of surfaces comprises a shoulder formed on than exterior of each of the housing and the shaft.

21. A holder as claimed in claim 1, wherein the biasing means of the holder comprises a spring.

22. A placement tool for the holder of claim 1 comprising:
- a gripping means operable to engage with the first and the second members of the holder and to press said first and second members together against the bias of the biasing means;
- the gripping means being further operable to release and disengage from the holder so as to allow the biasing means to release and thereby bias the first and second members apart;
- handle means disposed remote from the gripping means for operating the gripping means;
- the handle means being connected to the gripping means via a linkage means; and
- a housing for at least partially accommodating the linkage means.

23. A placement tool as claimed in claim 22, wherein the gripping means comprises a pair of gripping jaws movably mounted on a support block, the gripping jaws being movable between an open position in which the gripping jaws are most spread-apart from each other and a closed position in which the gripping jaws are closest each other.

24. A placement tool as claimed in claim 23, wherein the housing comprises a tube having distal and proximal ends and a passage extending between the distal end and the proximal ends, the tube being coupled with the support block at the distal end and with the handle means at the proximal end.

25. A placement tool as claimed in claim 24, wherein the linkage means comprises a connecting rod which in use is disposed in the passage of the housing, the connecting rod having distal and proximal ends, said rod being connected to the handle means at the proximal end, and said rod being axially movable in the housing by the handle means between a most distal position and a most proximal position, the connecting rod being connected to the griping jaws via a series of kinematic pairs operable to transform axial movement of the connecting rod, upon operating the handle means, so as to move the gripping jaws between the open and the closed positions.

26. A placement tool as claimed in claim 25, wherein the series of kinematic pairs comprises at least one first link element movably mounted on the support block, the joint element being movable together with the connecting rod; at least one second link element provided at each of the gripping jaws; the second link elements of each of the gripping jaws being engaged with the at least one first link element, so that movements of said first link element result in the gripping jaws moving towards each other or spreading apart.

* * * * *